US012619880B2

(12) United States Patent
Lu et al.

(10) Patent No.: US 12,619,880 B2
(45) Date of Patent: May 5, 2026

(54) METHODS, DEVICES AND MEDIA FOR RE-WEIGHTING TO IMPROVE KNOWLEDGE DISTILLATION

(71) Applicants: Peng Lu, Montreal (CA); Ahmad Rashid, Montreal (CA); Mehdi Rezagholizadeh, Montreal (CA); Abbas Ghaddar, Montreal (CA)

(72) Inventors: Peng Lu, Montreal (CA); Ahmad Rashid, Montreal (CA); Mehdi Rezagholizadeh, Montreal (CA); Abbas Ghaddar, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1184 days.

(21) Appl. No.: 17/231,514

(22) Filed: Apr. 15, 2021

(65) Prior Publication Data

US 2022/0343175 A1     Oct. 27, 2022

(51) Int. Cl.
| | |
|---|---|
| *G06N 3/088* | (2023.01) |
| *G06N 3/045* | (2023.01) |
| *G06N 3/084* | (2023.01) |
| *G06N 3/0985* | (2023.01) |

(52) U.S. Cl.
CPC ............. *G06N 3/088* (2013.01); *G06N 3/045* (2023.01); *G06N 3/084* (2013.01); *G06N 3/0985* (2023.01)

(58) Field of Classification Search
CPC ...... G06N 3/088; G06N 3/045; G06N 3/0985; G06N 3/084
See application file for complete search history.

(56) References Cited

U.S. PATENT DOCUMENTS

| | | |
|---|---|---|
| 2020/0104717 A1 | 4/2020 | Alistarh |
| 2020/0302295 A1 | 9/2020 | Tung et al. |

FOREIGN PATENT DOCUMENTS

| | | |
|---|---|---|
| CN | 111223483 A | 6/2020 |
| WO | WO-2019240964 A1 * | 12/2019 |

OTHER PUBLICATIONS

Ren, Mengye, et al. "Learning to reweight examples for robust deep learning." International conference on machine learning. PMLR, 2018. (Year: 2018).*

Liu, Linqing, et al. "Mkd: a multi-task knowledge distillation approach for pretrained language models." arXiv preprint arXiv:1911.03588 (2019). (Year: 2019).*

Zhang, Youcai, et al. "Prime-Aware Adaptive Distillation." arXiv preprint arXiv:2008.01458 (2020). (Year: 2020).*

Vyas, Nidhi, Shreyas Saxena, and Thomas Voice. "Learning soft labels via meta learning." arXiv preprint arXiv:2009.09496 (2020). (Year: 2020).*

Jin, Woojeong, et al. "Msd: Saliency-aware knowledge distillation for multimodal understanding." arXiv preprint arXiv:2101.01881 (2021). (Year: 2021).*

(Continued)

*Primary Examiner* — Michelle T Bechtold
*Assistant Examiner* — Nicholas S Wu

(57) ABSTRACT

Methods, devices and processor-readable media for re-weighting to improve knowledge distillation are described. A reweighting module may be used to determine relative weights to assign to a ground truth label and dark knowledge distilled from the teacher (i.e. the teacher output logits used as soft labels). A meta-reweighting method is described to optimize the weights for a given labeled data sample.

20 Claims, 10 Drawing Sheets

(56) References Cited

OTHER PUBLICATIONS

Shu, Jun, et al. "Meta-weight-net: Learning an explicit mapping for sample weighting." Advances in neural information processing systems 32 (2019). (Year: 2019).*

Heydari, A. Ali, Craig A. Thompson, and Asif Mehmood. "Softadapt: Techniques for adaptive loss weighting of neural networks with multi-part loss functions." arXiv preprint arXiv:1912.12355 (2019). (Year: 2019).*

Groenendijk, Rick, et al. "Multi-Loss Weighting with Coefficient of Variations." arXiv e-prints (2020): arXiv-2009. (Year: 2020).*

M. Ren, W. Zeng, B. Yang, and R. Urtasun. Learning to reweight examples for robust deep learning. In ICML, 2018.

Koh, Pang Wei and Liang, Percy. Understanding black-box predictions via influence functions. In Proceedings of the 34th International Conference on Machine Learning, ICML, 2017.

Geoffrey Hinton, Oriol Vinyals, and Jeff Dean. Distilling the knowledge in a neural network. NIPS Workshop, 2014.

Jun Shu, Qi Xie, Lixuan Yi, Qian Zhao, Sanping Zhou, Zongben Xu, and Deyu Meng. Meta-weight-net: Learning an explicit mapping for sample weighting. arXiv preprint arXiv:1902.07379, 2019.

Zhenzhen Li, Jian-Yun Nie, Benyou Wang, Pan Du, Yuhan Zhang, Lixin Zou, and Dongsheng Li. Meta-learning for neural relation classification with distant supervision. In Proceedings of the 29th ACM International Conference on Information & Knowledge Management 2020.

Dong, B., Hou, J., Lu, Y., and Zhang, Z. Harvesting dark knowledge utilizing anisotropic information retrieval for overparameterized neural network. arXiv preprint arXiv:1910.01255, 2019.

* cited by examiner

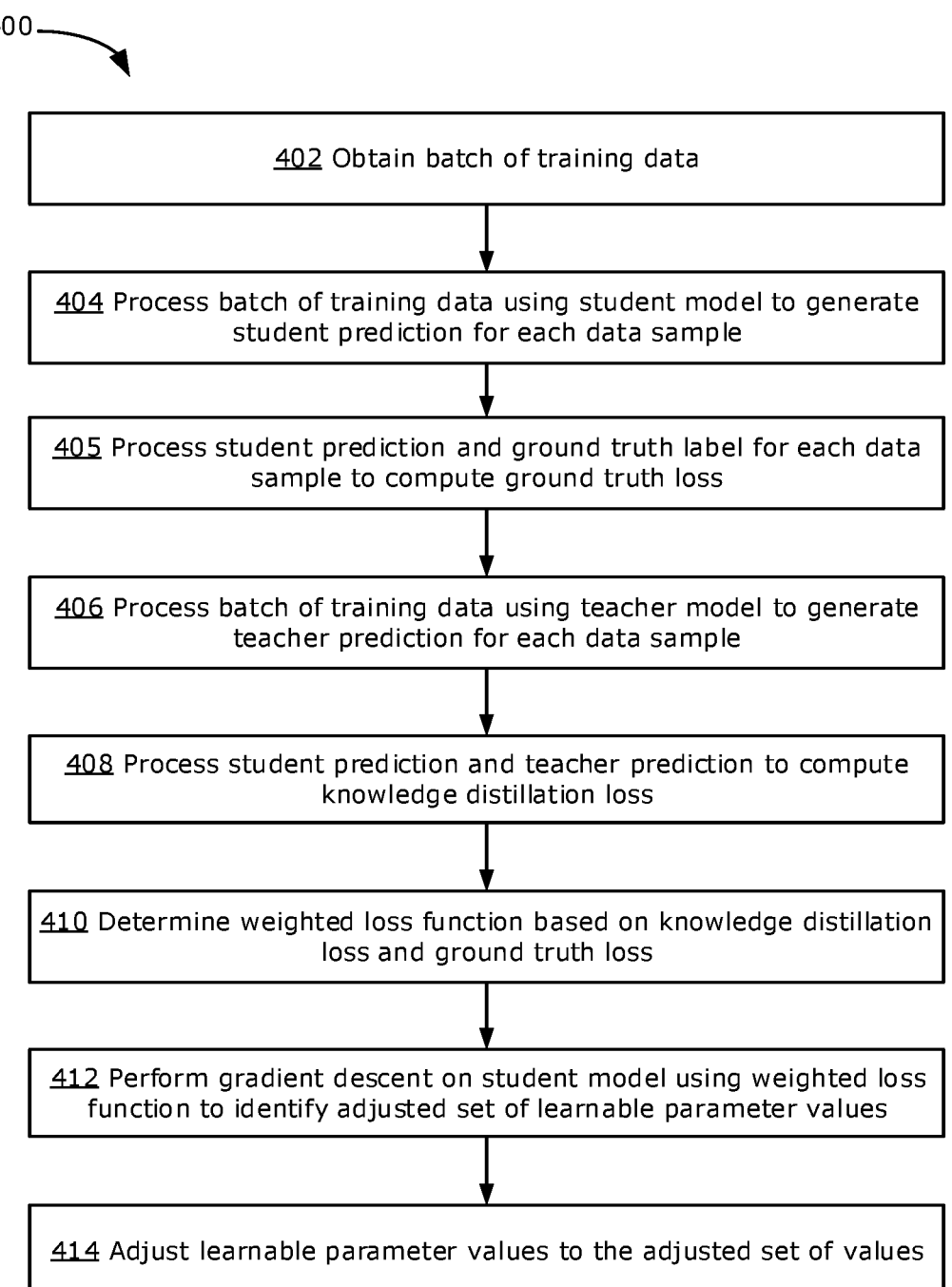

400

| 402 Obtain batch of training data |

| 404 Process batch of training data using student model to generate student prediction for each data sample |

| 405 Process student prediction and ground truth label for each data sample to compute ground truth loss |

| 406 Process batch of training data using teacher model to generate teacher prediction for each data sample |

| 408 Process student prediction and teacher prediction to compute knowledge distillation loss |

| 410 Determine weighted loss function based on knowledge distillation loss and ground truth loss |

| 412 Perform gradient descent on student model using weighted loss function to identify adjusted set of learnable parameter values |

| 414 Adjust learnable parameter values to the adjusted set of values |

FIG. 4

800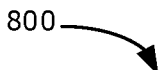

802 Determine optimized values of learnable parameters as a function of a knowledge distillation perturbation variable and a ground truth perturbation variable with respect to the batch of training data 804 Determine, for each training data sample, optimized knowledge distillation perturbation variable and ground truth perturbation variable values with respect to a batch of validation data 806 Define weighted loss function for each training data sample using the estimated optimized knowledge distillation perturbation variable as the KD weight, and the estimated optimized ground truth perturbation variable as the ground truth weight

FIG. 8

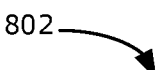

802

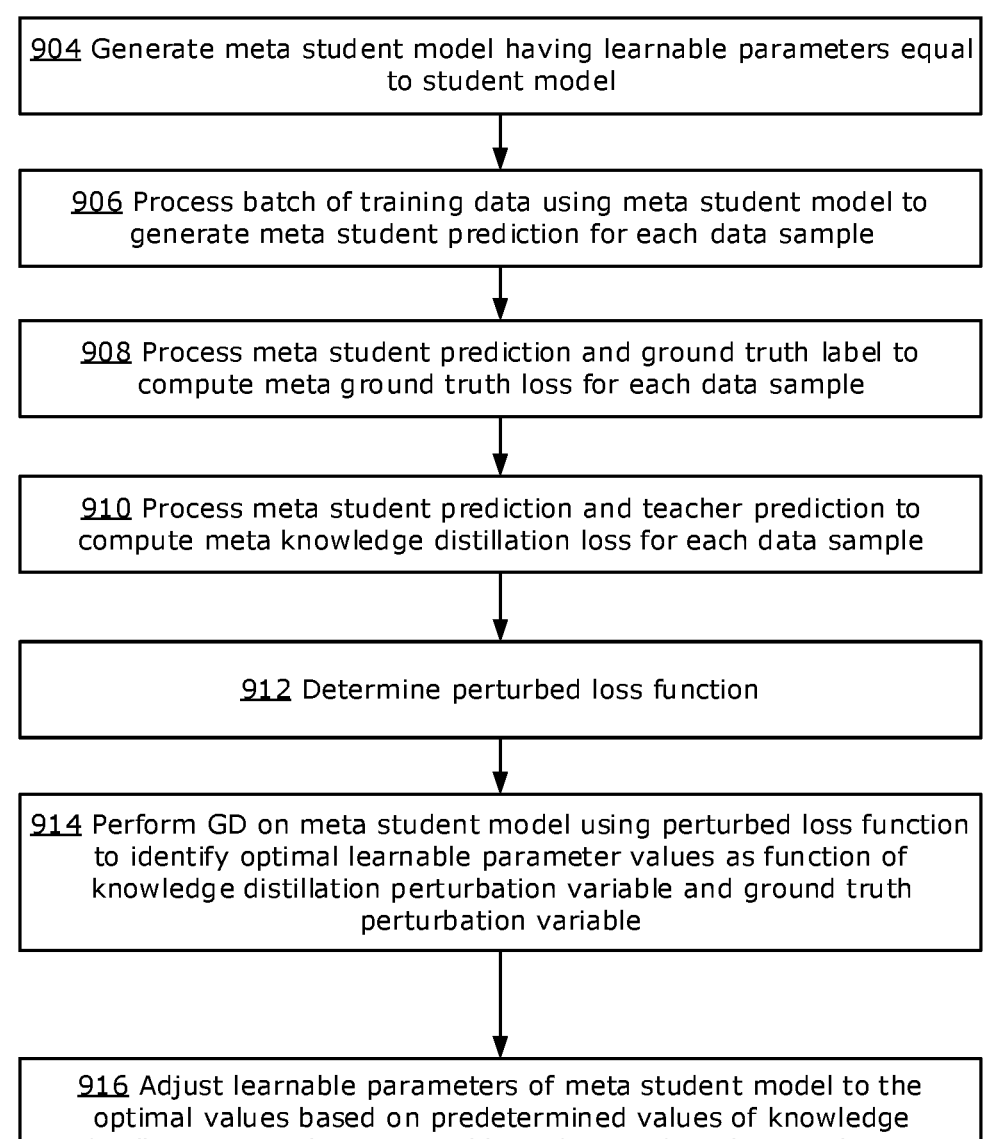

904 Generate meta student model having learnable parameters equal to student model 906 Process batch of training data using meta student model to generate meta student prediction for each data sample 908 Process meta student prediction and ground truth label to compute meta ground truth loss for each data sample 910 Process meta student prediction and teacher prediction to compute meta knowledge distillation loss for each data sample 912 Determine perturbed loss function 914 Perform GD on meta student model using perturbed loss function to identify optimal learnable parameter values as function of knowledge distillation perturbation variable and ground truth perturbation variable 916 Adjust learnable parameters of meta student model to the optimal values based on predetermined values of knowledge distillation perturbation variable and ground truth perturbation variable, thereby generating adjusted meta student model

FIG. 9

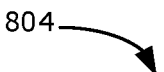

804

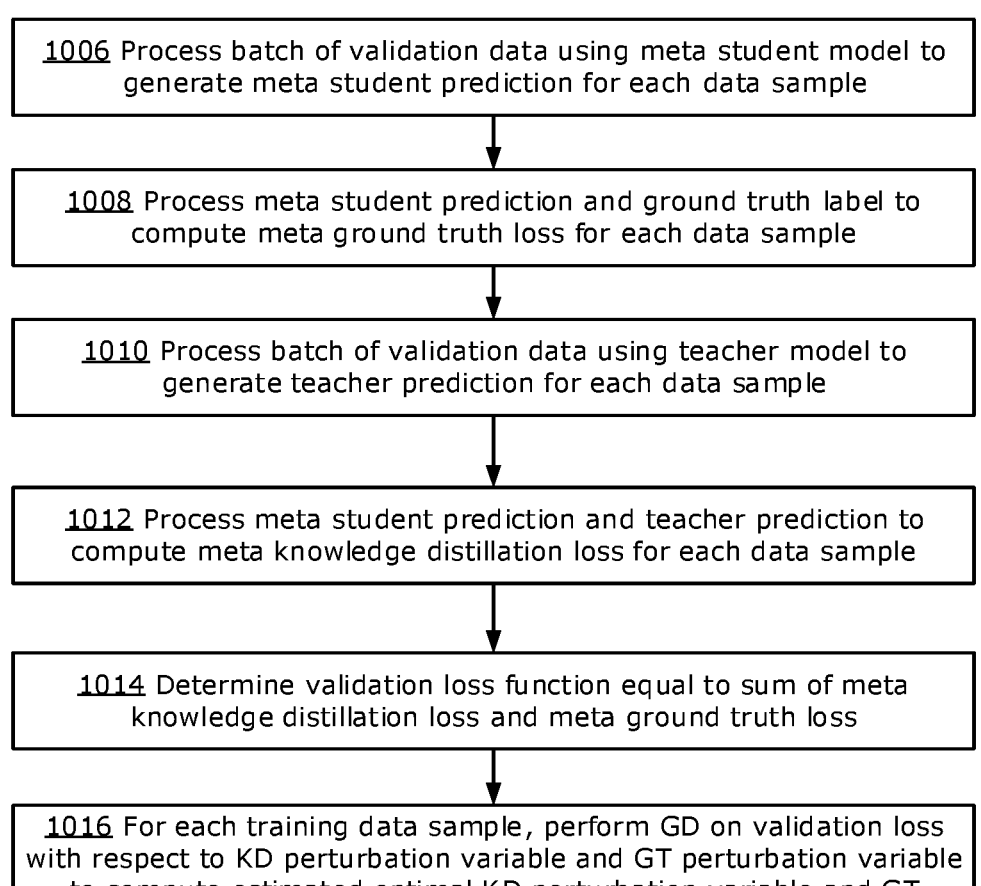

1006 Process batch of validation data using meta student model to generate meta student prediction for each data sample 1008 Process meta student prediction and ground truth label to compute meta ground truth loss for each data sample 1010 Process batch of validation data using teacher model to generate teacher prediction for each data sample 1012 Process meta student prediction and teacher prediction to compute meta knowledge distillation loss for each data sample 1014 Determine validation loss function equal to sum of meta knowledge distillation loss and meta ground truth loss 1016 For each training data sample, perform GD on validation loss with respect to KD perturbation variable and GT perturbation variable to compute estimated optimal KD perturbation variable and GT perturbation variable

FIG. 10

METHODS, DEVICES AND MEDIA FOR RE-WEIGHTING TO IMPROVE KNOWLEDGE DISTILLATION

TECHNICAL FIELD

The present disclosure generally relates to knowledge distillation, and in particular to methods, devices and processor readable media for re-weighting to improve knowledge distillation.

BACKGROUND

Machine Learning (ML) is an artificial intelligence technique in which algorithms are used to build a model from sample data that is capable of being applied to input data to perform a specific inference task (i.e., making predictions or decisions based on new data) without being explicitly programmed to perform the specific inference task. Deep learning is one of the most successful and widely deployed machine learning algorithms. In deep learning, artificial neural networks typically consist of layers of non-linear parametric functions or "neurons". To train the neural network using supervised learning, data samples are received by an input layer of the network and are processed by the neurons of the network to generate an output, such as inference data, at an output layer of the network. This is called forward propagation. The output pf the network is compared to semantic information associated with the data samples, such as semantic labels indicating a ground truth that can be compared to the inference data generated by the network. Training the neural network involves optimizing the learnable parameters of the neurons, typically using gradient-based optimization algorithms, to minimize a loss function. This process is called backpropagation. A particular configuration or architecture of an artificial neural network, or simply neural network (NN) is commonly referred to as a neural network model.

Typically neural network models trained using supervised learning consist of upwards of billions of parameters and are therefore cumbersome to deploy, because storing the parameters and running these neural network models on resource constrained computing devices (e.g. computing devices having limited computing resources), such as mobile devices, embedded devices, or edge devices, is infeasible. Therefore, a variety of model compression and acceleration techniques have been developed to reduce either the number of parameters, or the memory required to store each parameter, of a neural network model prior to deployment on computing devices with limited computing resources.

Knowledge Distillation (KD) is a compression technique used to transfer the knowledge of a large trained neural network model (i.e. a neural network model with many learned parameters) to a smaller neural network model (i.e. a neural network model with fewer learned parameters than the large trained neural network model). KD utilizes the generalization ability of the larger trained neural network model (referred to as the "teacher model" or "teacher") using the inference data output by the larger trained model as "soft targets", which are used as a supervision signal for training a smaller neural network model (called the "student model" or "student"). This technique stands in contrast to conventional supervised training of a neural network model, in which "hard targets" corresponding to the ground truth reflected in labelled training data of a training dataset are used as the sole supervision signal to train the neural network model.

In KD, the student receives both soft targets and hard targets as supervision signals. This allows the student to achieve better performance after being trained on the same dataset as the teacher, as the soft targets provide higher entropy and less variance (i.e. better generalization) than the hard targets. A generalized technique for knowledge distillation is described by Geoffrey Hinton, Oriol Vinyals and Jeff Dean in *Distilling the Knowledge in a Neural Network*, https://arxiv.org/abs/1503.02531.

FIG. 1 shows a typical configuration 10 for conventional KD. A teacher 20 is used to train a student 30. The teacher 20 receives input data 22 from a dataset used to train the student 30 and generates teacher inference data 24 based on the input data 22. The teacher inference data 24 is used as a soft target for supervision of the student 30, and the student 30 may be trained at least in part using a knowledge distillation loss function based on a comparison of the teacher inference data 24 to the student inference data 34 based on the same input data 22 provided to the teacher 20.

The teacher 20 typically has high prediction accuracy for a given inference task, or scores highly on some other relevant metric, but is too computationally intensive for practical deployment to computing devices with limited computing resources. The student 30, on the other hand, may reasonably be deployed to a computing device with limited computing resources (e.g. memory and/or processing power). The teacher 20 is pre-trained, and the student 30 is generally trained using the same training dataset used to train the teacher 20; however, this pre-training of the teacher 20 is not always necessary. KD proposes training the student 30 using two different sources of supervision: first, the labels of the labeled data samples in the training dataset (used to determine a ground truth loss), and second, the outputs (i.e. teacher inference data 24) of the teacher 20 (used to determine a knowledge distillation loss, as described above). Typically, the outputs of teacher 20 (i.e., teacher inference data 24) which provide a supervision signal to the student 30 are the logits generated by the teacher 20, i.e. the predictions of the teacher 20 prior to normalization using a softmax function. The logits of teacher 20 ("the teacher logits") contain some so-called "dark knowledge" of the teacher 20, which can be used as a "soft label" to provide information about the relative differences between the probabilities of various predictions, which the teacher 20 has been trained to generate (e.g. different classes for a classification task). Evidence shows that the student model tends to benefit from this dark knowledge.

However, there is no guarantee that the teacher logits always contain high-quality dark knowledge for every labeled data sample in a training dataset. For instance, when the teacher's prediction (i.e. the teacher inference data 24) with respect to a given training data sample is incorrect, the dark knowledge provided tends to contain noise, which is hard to distinguish from useful dark knowledge. It is also quite common that the labels of the training data samples contain noise; in such cases, the dark knowledge generated by the teacher 20 in response to these noisy training data samples may be more useful for training the student 30 than the labels of the training data samples. Therefore, it is important to know and estimate the impact of each individual type of knowledge on different training data samples in a training dataset used to train the student 30 to improve the Knowledge Distillation.

Therefore, there exists a need for knowledge distillation techniques that enable more or less reliance on a teacher's supervision signal relative to labels of the training data samples, as appropriate, to optimize the training of the student.

SUMMARY

The present disclosure provides methods, devices, and processor readable media for re-weighting to improve knowledge distillation. A reweighting module may be used to determine relative weights to assign to the ground truth (i.e. training data labels) and the dark knowledge distilled from the teacher (i.e. the teacher output logits used as soft labels). By weighting the two types of labels, and thereby the two types of training loss (KD loss based on the teacher's outputs, and ground truth (GT) loss based on the training data labels) differently relative to each other, one source of feedback can be emphasized over another with respect to a given batch of training data.

In some examples, the reweighting module may determine a ground truth weight to emphasize a ground truth label of a training data sample, and a knowledge distillation weight to emphasize the soft label from the teacher, based on user input (such as input from an expert with insight into the characteristics of a given batch of training data). In some examples, the reweighting module may determine the ground truth weight and the knowledge distillation weight using a meta-reweighting process. The meta-reweighting process computes the weights assigned to the ground truth loss and the knowledge distillation loss based on a meta-reweighting algorithm similar to the meta-reweighting algorithm described by M. Ren, W. Zeng, B. Yang, and R. Urtasun. "Learning to reweight examples for robust deep learning". In ICML, 2018, arXiv:1803.09050 (hereinafter "Ren"). Meta-reweighting is a meta-learning technique that uses machine learning to assign weights to training data samples based on their gradient directions. To determine the weights in the Ren reference, a meta gradient descent step is performed on existing training weights to minimize the generalization loss on a validation set. This method has shown success in both the Natural Language Processing (NLP) and Computer Vision (CV) fields. However, the goal in the Ren reference is to weigh the relative contributions of different training data samples on model training. In contrast, the meta-reweighting process in the present disclosure weighs the relative contributions of the teacher's soft label and the training data's hard label for each training data sample.

As used herein, the term "optimize" refers to adjusting an element to be closer to a desired state, and "optimized" describes an element that has been so adjusted. The desired state may be the result of an estimate that may or may not be fully accurate or correct, or may only be correct locally: thus, an "optimal" value for a variable may refer to either a global optimum or a local optimum, and may also refer to an estimated optimum value.

As used herein, "student", "student model", and "student network" are used interchangeably to refer to a small model that may be trained using KD, and "teacher", "teacher model", and "teacher network" are used interchangeably to refer to a large trained model that may be used to train the student model using KD.

As used herein, "neural network" refers to an executable computational structure, such as machine-executable instructions, that can be executed in a training mode to learn values of the learnable parameters (e.g. weights and biases) of a model to perform a particular inference task. Once the neural network has been trained, it can be operated in an inference mode to perform the inference task. The neural networks described herein shall be described as recurrent neural networks configured to perform a particular inference task relating to input data, such as sequences of text tokens representative of written language. Examples of inference tasks include classification tasks such as sentiment analysis, or generation tasks such as language translation. However, it will be appreciated that various embodiments described herein may be equally applicable to other inference tasks, other neural network (such as fully connected or convolutional neural networks), with appropriate changes to certain operations such as the specific loss functions used for knowledge distillation.

In some aspects, the present disclosure provides a method for knowledge distillation. A batch of training data comprising one or more labeled training data samples is obtained. Each labeled training data sample has a respective ground truth label. The batch of training data is processed, using a student model comprising a plurality of learnable parameters, to generate, for input data in each data sample in the batch of training data, a student prediction. For each labeled training data sample in the batch of training data, the student prediction and the ground truth label are processed to compute a respective ground truth loss. The batch of training data is processed, using a trained teacher model, to generate, for each labeled training data sample in the batch of training data, a teacher prediction. For each labeled data sample in the batch of training data, the student prediction and the teacher prediction are processed to compute a respective knowledge distillation loss. A weighted loss is determined based on the knowledge distillation loss and ground truth loss for each labeled training data sample in the batch of training data. Gradient descent is performed on the student model using the weighted loss to identify an adjusted set of values for the plurality of learnable parameters of the student. The values of the plurality of learnable parameters of the student are adjusted to the adjusted set of values.

In some aspects, the present disclosure provides a device, comprising a processor and a memory. The memory has stored thereon instructions which, when executed by the processor, cause the device to perform a number of operations. A batch of training data comprising one or more labeled training data samples is obtained. Each labeled training data sample has a respective ground truth label. The batch of training data is processed, using a student model comprising a plurality of learnable parameters, to generate, for input data in each data sample in the batch of training data, a student prediction. For each labeled training data sample in the batch of training data, the student prediction and the ground truth label are processed to compute a respective ground truth loss. The batch of training data is processed, using a trained teacher model, to generate, for each labeled training data sample in the batch of training data, a teacher prediction. For each labeled data sample in the batch of training data, the student prediction and the teacher prediction are processed to compute a respective knowledge distillation loss. A weighted loss is determined based on the knowledge distillation loss and ground truth loss for each labeled training data sample in the batch of training data. Gradient descent is performed on the student model using the weighted loss to identify an adjusted set of values for the plurality of learnable parameters of the student. The values of the plurality of learnable parameters of the student are adjusted to the adjusted set of values.

In some examples, determining the weighted loss for a data sample comprises: determining a knowledge distillation weight for the labeled training data sample, determining a ground truth weight for the labeled training data sample, and computing the weighted loss as the sum of: the knowledge distillation loss weighted by the knowledge distillation weight, and the ground truth loss weighted by the ground truth weight.

In some examples, the knowledge distillation weight and ground truth weight are determined based on user input.

In some examples, the knowledge distillation weight and ground truth weight are determined by a meta reweighting process.

In some examples, the meta reweighting process comprises: for each respective learnable parameter of the plurality of learnable parameters of the student, determining an optimized value of the respective learnable parameter as a function of a knowledge distillation perturbation variable and a ground truth perturbation variable with respect to the batch of training data, determining, for each labeled training data sample in the batch of training data, a respective estimated optimized value of the knowledge distillation perturbation variable and a respective estimated optimized value of the ground truth perturbation variable with respect to a batch of validation data, and for each labeled training data sample in the batch of training data, using the respective estimated optimized value of the knowledge distillation perturbation variable as the knowledge distillation weight and the respective estimated optimized value of the ground truth perturbation variable as the ground truth weight.

In some examples, determining the optimized value of each respective learnable parameter as a function of the knowledge distillation weight and the ground truth weight comprises: generating a meta student model having a plurality of learnable parameters with values equal to the values of the plurality of learnable parameters of the student model, processing the batch of training data, using the meta student model, to generate, for each labeled training data sample in the batch of training data, a meta student prediction, for each labeled training data sample in the batch of training data, processing the meta student prediction and the ground truth label to compute a respective meta ground truth loss, for each labeled training data sample in the batch of training data, processing the meta student prediction and the teacher prediction to compute a respective meta knowledge distillation loss, determining a perturbed loss as the sum of: the meta knowledge distillation loss weighted by the knowledge distillation perturbation variable, and the meta ground truth loss weighted by the ground truth perturbation variable, performing gradient descent on the meta student model using the perturbed loss to identify an optimal set of values of the plurality of learnable parameters of the meta student model, such that each value in the optimal set of values is defined as a function of the knowledge distillation perturbation variable and the ground truth perturbation variable, and adjusting the values of the plurality of learnable parameters of the meta student model to the optimal set of values based on a predetermined value of the knowledge distillation perturbation variable and a predetermined value of the ground truth perturbation variable, thereby generating an adjusted meta student model.

In some examples, the predetermined value of the knowledge distillation perturbation variable is zero, and the predetermined value of the ground truth perturbation variable is zero, and wherein adjusting the values of the plurality of learnable parameters of the meta student model comprises leaving the values of the plurality of learnable parameters of the meta student model unchanged.

In some examples, the batch of validation data comprises one or more labeled validation data samples, each labeled validation data sample having a respective ground truth label, and determining, for each data sample in the batch of training data, a respective estimated optimized value of the knowledge distillation perturbation variable and a respective estimated optimized value of the ground truth perturbation variable with respect to a second batch of data comprises: processing the batch of validation data, using the adjusted meta student model, to generate, for each labeled validation data sample in the batch of validation data, a meta student prediction, for each labeled validation data sample in the batch of validation data, processing the adjusted meta student prediction and the ground truth label to compute a respective meta ground truth loss, processing the batch of validation data, using the teacher model, to generate, for each labeled validation data sample in the batch of validation data, a teacher validation prediction, for each labeled validation data sample in the batch of training data, processing the adjusted meta student prediction and the teacher validation prediction to compute a respective meta knowledge distillation loss, determining a validation loss based on the meta knowledge distillation loss and the meta ground truth loss for each labeled validation data sample in the batch of validation data, for each labeled training data sample in the batch of training data: computing a gradient of the validation loss with respect to the knowledge distillation perturbation variable and the ground truth perturbation variable by computing a gradient of the validation loss with respect to the optimal set of values of the plurality of learnable parameters of the meta student model, each learnable parameter value of the optimal set of values being defined as a function of the knowledge distillation perturbation variable and the ground truth perturbation variable, performing gradient descent to compute: the estimated optimized value of the knowledge distillation perturbation variable, and the estimated optimized value of the ground truth perturbation variable.

In some examples, the method further comprises: obtaining one or more additional batches of training data, obtaining, for each additional batch of training data, an additional batch of validation data, and repeating, for each additional batch of training data, generating the student predictions, computing the ground truth losses, generating the teacher predictions, computing the knowledge distillation losses, determining the weighted loss, identifying the adjusted set of values of the plurality of learnable parameters of the student, and adjusting the values of the plurality of learnable parameters of the student.

In some examples, the ground truth loss comprises a cross entropy loss, and the trained teacher model is trained to perform a natural language processing binary classification task on training data wherein each labeled training data sample comprises input data comprising a plurality of text tokens.

In some aspects, the present disclosure provides a method for training a model using machine learning based on a first loss function and a second loss function. The method comprises: propagating a first labeled data sample through the model to compute the first loss and the second loss, determining a weighted loss, comprising a sum of the first loss weighted by a first weight and the second loss weighted by a second weight, by: propagating the first labeled data sample through the model to determine a state of the model as a function of a first perturbation variable and a second perturbation variable, propagating one or more additional labeled data samples through the model to compute a gradient of a validation loss with respect to the first perturbation variable and the second perturbation variable, computing an optimized value of the first perturbation variable and an optimized value of the second perturbation variable based on the gradient, and computing the weighted loss using the optimized value of the first perturbation variable as the first weight and the optimized value of the second perturbation variable as the second weight, and adjusting learnable parameters of the model using the weighted loss.

In some aspects, the present disclosure provides a non-transitory processor-readable medium containing instructions which, when executed by a processor of a device, cause the device to perform the steps of the methods described above.

In some such embodiments, the method or device may exhibit various advantages over known techniques. Some embodiments may significantly improve the performance of knowledge distillation by assigning a larger weight $\lambda^{KD}$ to the KD loss when the student needs to learn more from the teacher's dark knowledge, while assigning larger weight $\lambda^{CE}$ to the ground truth (GT) loss when the student needs to learn more from the label of the labeled training data sample. In some examples, users with expert information can manually define the weights by providing user input. In some embodiments, an auxiliary algorithm can be created (e.g., through machine learning) to set these weights. A naïve version of such a reweighting algorithm could have two training loops: in the inner training loop, gradient descent could be performed to optimize the weights for each labeled training data sample; in the outer loop, the weights could be fixed, and gradient descent could be used to learn the values of the learnable parameters of the student. Such a naïve reweighting algorithm could achieve higher accuracy in the student despite requiring significantly longer training times than conventional KD.

By using a meta-reweighting process, weights for different loss functions can be adaptively assigned for every labeled training data sample in a training dataset used to train the student, thereby improving the performance of the training of the student. In addition, different inference tasks, including NLP generative and discriminative tasks such as sentiment analysis, sentence generation, and natural language inference, tend to have different weighting scheme: a pre-defined weighting scheme may be highly task-specific and hard to transfer to other tasks without hurting performance. By using a meta-reweighting process, examples described herein may not need to consider task-specific information and can be easily extended to a range of tasks.

BRIEF DESCRIPTION OF THE DRAWINGS

Embodiments will now be described by way of examples with reference to the accompanying drawings, in which like reference numerals may be used to indicate similar features.

FIG. 4 is a flowchart showing steps of an example method for performing knowledge distillation using reweighting, according to example embodiments described herein.

FIG. 8 is a flowchart showing steps of an example method for meta-reweighting as an example of the operation to determine a weighted loss function in FIG. 4.

FIG. 9 is a flowchart showing example sub-steps of the operation to determine optimized values of learnable parameters in FIG. 8.

FIG. 10 is a flowchart showing example sub-steps of the operation to determine optimized knowledge distillation weight and ground truth weight values in FIG. 8.

DESCRIPTION OF EXAMPLE EMBODIMENTS

Figure 1:
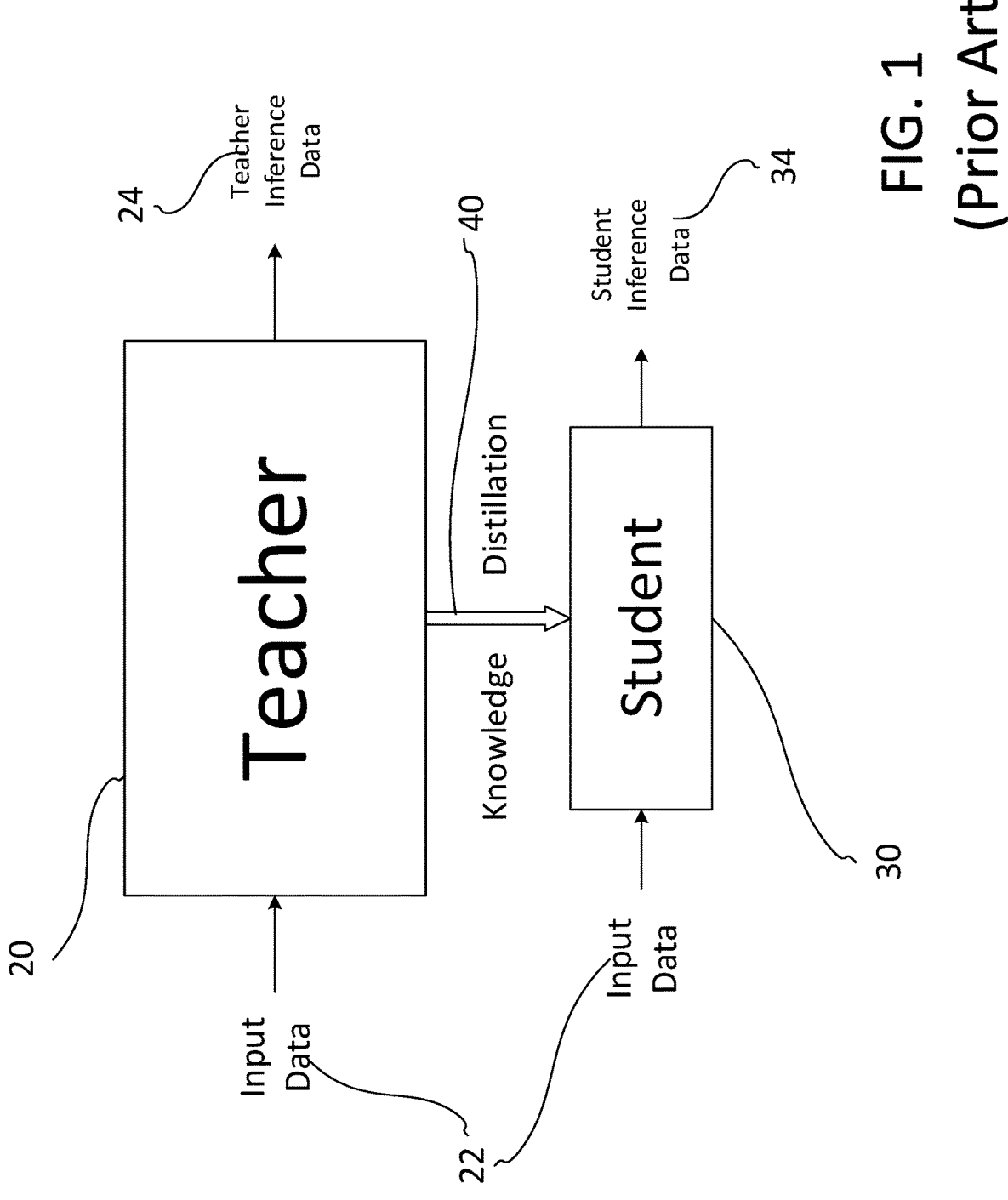
FIG. 1 is a block diagram showing conventional knowledge distillation between a teacher network and a student sub-network.

Conventional KD is widely used because it can achieve good accuracy, is architecture agnostic as to the structure of the teacher and student models (e.g., various types of neural networks), and only requires access to the outputs of the teacher. It can be applied to a wide range of predictions tasks, including any classification task, such as image recognition in CV, sentiment analysis in NLP, natural language inference in NLP, etc. It can also be applied to regression tasks. A conventional KD configuration, such as configuration 10 shown in FIG. 1, may compute a training loss based on the teacher inference data 24 for each training data sample, the student inference data 34 for each training data sample, and the labels of the training data samples. The training loss is used as an objective function to adjust the values of the learnable parameters of the student, for example by back-propagation. The training loss may be computed as a weighted sum of the ground truth loss and KD loss. For example, assuming that the ground truth loss is computed as a cross-entropy (CE) loss (as opposed to another loss type usable in described embodiments, such as mean-square error loss, quadratic loss, etc.), a typical training loss used for KD could be computed as follows:

$$L = \alpha \cdot L_{CE}(y, S_\theta(x)) + (1-\alpha) \cdot L_{KD}(T(x), S_\theta(x))$$

wherein L is the training loss used to adjust the learnable parameters of the student, $\alpha$ is a step size or learning rate hyperparameter (typically set to a value such as $1 \times e^{-3}$), $L_{CE}$ is the cross-entropy loss, $L_{KD}$ is the knowledge distillation loss, y is the ground truth label associated with a training data sample x, $S_\theta(x)$ is the student inference data of the student with the values of the learnable parameters $\theta$ based on processing the training data sample x, $T(x)$ is the teacher inference data 24 of the teacher based on processing the training data sample x.

$L_{CE}$ is therefore a function that is used to compute a Cross-Entropy (CE) loss between the ground-truth label of the labeled training data sample input into the teacher and the student and the output of the student, $S_\theta(x)$, and $L_{KD}$ is a function that is used to compute a KD loss based on the Kullback-Leibler (KL) divergence between the teacher prediction data 24 and the student prediction data 34. $L_{KD}$ may be defined such that the comparison between teacher prediction data 24 and student prediction data 34 is congruent. For example, the teacher prediction data 24 and student prediction data 34 used by $L_{KD}$ may be the respective models' logits (i.e. pre-normalized predictions), whereas the student prediction data 34 used by $L_{CE}$ may be the normalized predictions, such as a predicted probability distribution over a plurality of classes for a classification task, or the student's predicted label for the labeled training data sample x, such that the predicted probability distribution or student's predicted label can be compared to the ground truth label of the labeled training data sample x. Because the student's predicted probability distribution can be derived from the student's logits (by normalizing using a softmax function), and the student's predicted label may be derived from the student's predicted probability distribution (by applying an argmax function), various types of comparison operations using different student outputs can be performed by properly defining $L_{KD}$ and $L_{CE}$.

In a convention KD technique, the student $S_\theta(\cdot)$ updates its parameters $\theta$ by a gradient descent step to minimize the weighted sum of the two losses, i.e. training loss L. The gradient descent step may include back-propagation, wherein a partial derivative of the training loss with respect to each learned parameter of the student is computed, and the learned parameters are each adjusted in a direction (i.e. up or down) intended to reduce the training loss. Thus, the learnable parameters of the student move towards a gradient direction (i.e. gradient descent) which minimizes the training loss. The gradient descent operation can be represented as:

$$\theta_t = \theta_{t-1} - lr \cdot \nabla_{\theta_{t-1}} L$$

in which $\theta_t$ is the adjusted values of the learnable parameters, $\theta_{t-1}$ is the initial values of the learnable parameters, lr is a learning rate hyperparameter, and $\nabla_{\theta_{t-1}} L$ is the gradient of the training loss with respect to the learnable parameters.

Despite the overall usefulness of conventional KD, for many inference tasks, especially inferences tasks for natural language processing (NLP) applications, there is a significant gap between the performance of the trained teacher and the performance of the trained student. Various techniques have been applied to reduce this performance gap. Current KD methods maintain a fixed weight ratio of $\alpha$ to $1-\alpha$ for CE loss and KD loss respectively for every training data sample included in a training dataset used to train the student where a is a hyper-parameter.

This limits the performance of conventional KD in at least three ways. First, because both the label of a training data sample and the output of teacher (i.e. the teacher inference data) can provide supervision signals for the student, it is important to achieve a balance between these two kinds of supervision. The values of the learnable parameters of the student should be adjusted more significantly based on the teacher supervision for labeled training data samples whose labels are hard to learn from, which means it is better to increase the KD weight, such that the student learns more from the dark knowledge of teacher.

Second, the student's learnable parameters should be adjusted more significantly based on the teacher supervision for labeled training data samples in which the outputs of the teacher (i.e. the teacher inference data) are ambiguous or ambivalent (e.g., in a classification task, the teacher inference data 24 indicates a relatively low probability for even the most probable class), which means it is better to decrease the KD weight. In other words, if the dark knowledge is of low quality or confidence, the student should rely more heavily on the labels of the labeled training data samples.

Third, pre-specifying a weighting scheme for weighting the CE loss and KD loss presents potential challenges and may be limited by the expert knowledge of users setting the weights. Expert knowledge may be specific to a training dataset used to train the student and not easy to generalize across different inference tasks.

Example embodiments will now be described with respect to methods, devices, and non-transitory media for re-weighting to improve knowledge distillation.

Figure 2:
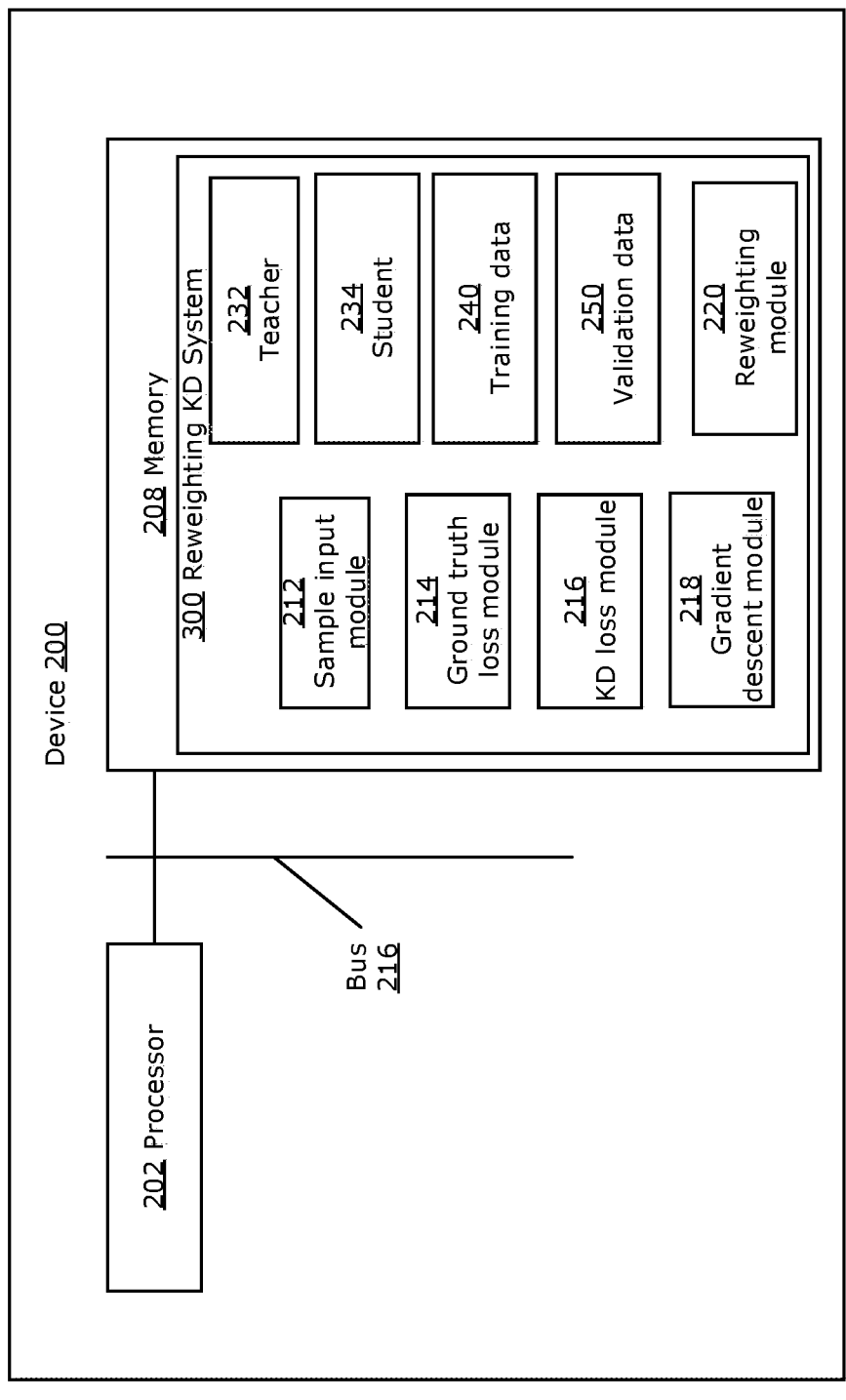
FIG. 2 is a block diagram showing a device for knowledge distillation, according to example embodiments described herein.

FIG. 2 shows a device 200 that may be used to perform the various knowledge distillation methods described herein. Although an example embodiment of the device 200 is shown and discussed below, other embodiments may be used to implement examples disclosed herein, which may include components different from those shown. Although FIG. 2 shows a single instance of each component of the device 200, there may be multiple instances of each component shown.

The device 200 includes one or more processors, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The one or more processors may collectively be referred to as a "processor device" or simply a processor 202.

The device 200 includes one or more memories, collectively referred to as memory 208, which may include a volatile or non-volatile memory (e.g., a flash memory, a random access memory (RAM), and/or a read-only memory (ROM)). The non-transitory memory 208 may store machine-executable instructions for execution by the processor 202, such as to carry out examples described in the present disclosure. Machine-executable instructions of a reweighting knowledge distillation system 300 or meta-reweighting knowledge distillation system 500 (not shown) are stored in the memory 208, which may be executed by the processor 202 to perform the steps of the methods described herein. The operation of the device 200 in executing the instructions of the various functional modules of the reweighting knowledge distillation system 300 or meta-reweighting knowledge distillation system 500 is described below with reference to FIGS. 3-10. The machine-executable instructions that are executable by the processor 202 to perform the functions of various functional modules used to perform knowledge distillation according to the methods described herein include machine-executable instructions of: a sample input module 212, a ground truth loss module 214, a KD loss module 216, a gradient descent module 218, and a reweighting module 220. The memory 208 may also store other software instructions, such as for implementing an operating system and other applications or functions.

The memory 208 may also store data used for performing the knowledge distillation methods described herein, such as a training dataset 240 consisting of multiple labeled training data samples (each labeled data sample includes input data and a ground truth label), and a validation dataset 250 consisting of additional labeled validation data samples (each additional labeled validation data sample includes input data and a ground truth label) that are set aside for use in validating the effectiveness of training (such as KD) of the student after training of the student has been completed. In some examples described herein, a portion of the validation dataset 250 may be used during the training of the student as part of a meta-reweighting process.

The memory 208 may also store the student 234 and teacher 232, each of which may include values of a plurality of learnable parameters ("learnable parameter values"), as well as a plurality of values for hyperparameters ("hyper-parameter values") used to control the structure and operation of the model. Hyperparameter values are usually set prior to training and are not adjusted during training, in contrast to learnable parameter values, which are adjusted during training.

In some examples, the device 200 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the device 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The components of the device 200 may communicate with each other via various means, such as a data bus 216. In some embodiments, the operations of the method of the present disclosure may be performed by a distributed computing system, such as one or more servers distributed in one or more datacenters, or one or more virtual machines instantiated by one or more servers of a datacenter or cloud computing platform. A distributed computing system is understood to fall within the meaning of "device". Alternatively, the operations of the method of the present disclosure may be performed by a service provided by a cloud computing platform. For example, a machine-learning-as-a-service may be provided by a cloud computing platform that performs the operations of the method of the present disclosure.

Figure 3:
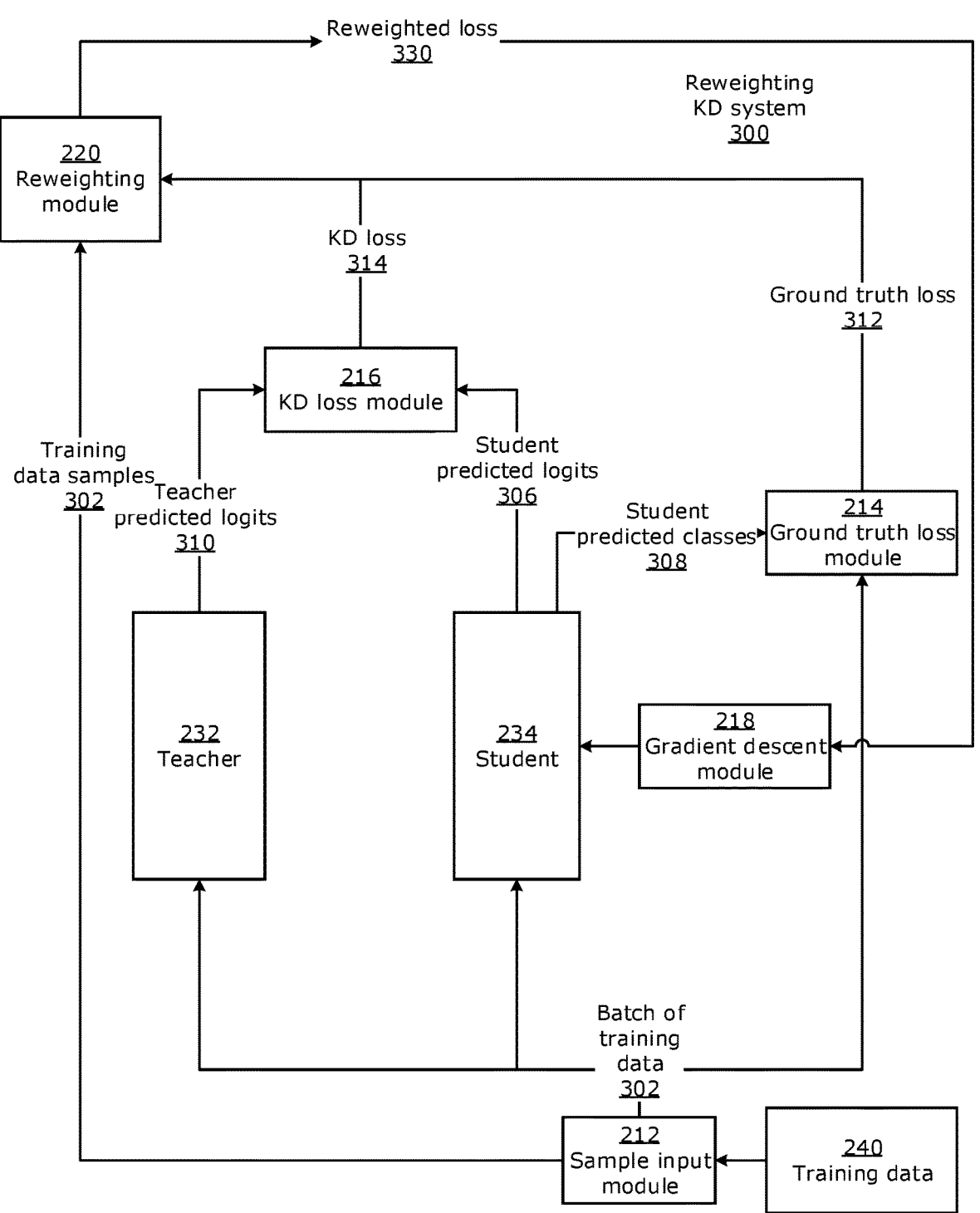
FIG. 3 is a block diagram showing a reweighting knowledge distillation system, according to example embodiments described herein.

FIG. 3 shows the various functional modules and data flows of a reweighting knowledge distillation system 300, including the sample input module 212, ground truth loss module 214, KD loss module 216, gradient descent module 218, and reweighting module 220 of the device 200 of FIG. 2. The operations of the reweighting knowledge distillation system 300 will be described with reference to an example knowledge distillation method 400 with reference to FIG. 4 below.

FIG. 4 is a flowchart showing operations of an example method 400 for performing knowledge distillation using reweighting, as performed by a knowledge distillation system such as the reweighting knowledge distillation system 300 of FIG. 3. It will be appreciated that the functional modules, inputs, and outputs of the reweighting knowledge distillation system 300 are used as examples of how to perform the operations of the method 400; in some embodiments, one or more of the various functional modules 212, 214, 216, 218, 220 may be changed, omitted, split into two or more functional modules, and/or combined with one or more of the other functional modules.

In the described examples, a ground truth (GT) loss 312 is used as part of the reweighting knowledge distillation system 300. The GT loss 312 may be referred to in this disclosure, and in particular in the example equations used herein, as a cross-entropy (CE) loss $L_{CE}$ used in the context of a binary classification task for a NLP application. It will be appreciated that other loss types, such as mean square error (MSE) loss, may be used in the context of other inference tasks for other applications, including NLP applications, as described above.

In the example of FIG. 3, the teacher 232, denoted as $T(\cdot)$, is a relatively large neural network model for an inference task (i.e. a neural network including a large number of learnable parameters implementing a model for an inference task) which has been trained to optimize the values of the learnable parameters of the large neural network model, and which is to be compressed using KD. The student 234, denoted as $S_\theta(\cdot)$, is a relatively smaller neural network model (i.e. a neural network including a smaller number of learnable parameters than the teacher and implementing a model for the inference task) which, once trained using KD, is to be deployed to a computing device having limited computing resources (e.g. memory and/or processing power) for inference (i.e. to output student inference data for new input data). The reweighting module 220 assigns a GT weight to the GT loss 312 and a KD weight to the KD loss 314. In the example of FIGS. 3 and 4, the implementation of the reweighting module 220 is not specified: in some examples, the reweighting module 220 may be a manually specified look-up table based on user input which contains a GT weight and a KD weight for each labeled training data sample included in the training dataset 240 used to train the student 234. In other examples, the reweighting module 220 may be a meta-reweighting module 510 as described with reference to FIG. 5-10 below. Other implementations of the reweighting module 220 are also possible, such as rule-based algorithms for assigning a GT weight and a KD weight to a given labeled training data sample in the training dataset 240 or to a given batch of training data obtained from the training dataset 240.

Method 400 begins with operation 402. At 402, a batch of training data is obtained from the training dataset 240. The batch of training data, denoted as X, includes at least one labeled training data sample obtained from the training dataset 240 and each labeled training data sample includes input data and a ground truth label that includes, for example, semantic information. For example, a batch of training data 302 may include one or more labeled training data samples (each denoted as x) obtained from the training dataset 240 by the sample input module 212. In some embodiments, the sample input module 212 may obtain labeled training data samples stochastically from the training dataset 240, particularly if the training dataset 240 includes a large number of labeled training data samples. For example, the training dataset 240 may include 100,000 labeled training data samples, and a batch of training data 302 may include 100 labeled training data samples obtained stochastically from the training dataset 240 by the sample input module 212.

At 404, the student 234 receives the input data of each respective labeled training data sample in the batch of training data 302 and processes the received input data to generate a student prediction (i.e. student inference data 34 from FIG. 1) based on the received input data. The student inference data 34 generated by processing the input data of a given labeled training data sample x in the batch of training data 302, denoted $S_\theta(x)$, may include student predicted logits 306 (i.e. pre-normalized probability distribution of the student's predictions), and/or a student predicted classes 308 (i.e. a normalized predicted probability distribution over multiple class for a classification task, which may be derived from the student predicted logits by applying a softmax function to normalize the student predicted logits 306 into a normalized probability distribution). In FIG. 3, both the student predicted logits 306 and student predicted classes 308 are shown being used as inputs to different functional modules (e.g. the KD loss module 216 and the ground truth loss module 218). It will be appreciated that, as described above, a given loss function may be defined to use either the student predicted logits 306 or student predicted classes 308, because the latter is derivable from the former by applying a normalization operation which may be built into the loss function, or not, as appropriate.

At 405, for each respective labeled training data sample x in the batch of training data 302, the ground truth loss module 214 processes the student prediction (shown here as the student predicted classes 308) and the ground truth label y of the respective labeled training data sample x) to compute a respective ground truth loss 312 for the respective labeled training data sample x, denoted $L_{CE}$ (indicating a cross entropy loss as the ground truth loss 312).

The cross entropy loss may be computed as:

$$L_{CE} = \sum_{c' \in C} \mathbb{1}_c(y) \log P(S_\theta(x))$$

$$\mathbb{1}_c(y) = \begin{cases} 1, & y = c \\ 0, & y \neq c \end{cases}$$

$$P(C) = softmax(C) = \left( \frac{\exp(c_1)}{\sum_j^{|C|} \exp(c_j)}, \frac{\exp(c_2)}{\sum_j^{|C|} \exp(c_j)}, \cdots, \frac{\exp(c_{|C|})}{\sum_j^{|C|} \exp(c_j)} \right)$$

wherein $\mathbb{1}_c(y)$ denotes an indicator function having the value 1 when the ground truth label y equals c and value 0 when y≠c, and P(C) is the normalized probability distribution (i.e. student predicted logits 306 normalized by a softmax function) of the student prediction with respect to the plurality of classes C of the classification task. Therefore, in this example, the student predicted classes 308 is P(C), i.e. a normalized probability distribution over a plurality of classes, and the ground truth loss module 214 receives P(C), i.e. $P(S_\theta(x))$, i.e. the student predicted classes 308 from the student 234.

At 406, the teacher 232 receives the input data of each respective labeled training data sample in the batch of training data 302 and processes the input data to generate a teacher prediction (i.e. teacher inference data 24 from FIG. 1). The teacher inference data 24 generated by processing the input data of a given data sample x, denoted T(x), may include teacher predicted logits 310.

At 408, for each respective labeled training data sample x in the batch of training data 302, the knowledge distillation loss module 216 receives and processes the student prediction (i.e. the student predicted logits 306) and the teacher prediction (i.e. the teacher predicted logits 310) to compute a respective knowledge distillation loss 314 for the respective labeled training data sample x.

The KD loss 314 between the student prediction (i.e. the student predicted logits 306) and the teacher prediction (i.e. the teacher predicted logits 310) may be defined based on Kullback-Leibler (KL) divergence as:

$$KL(P(S(x)) \mid P(T(x))) = \sum_{k \in X} P(T(x)) \log \left( \frac{P(T(x))}{P(S(x))} \right)$$

wherein, as described above, P(S(x)) is the student predicted classes 308 (i.e. normalized student predicted logits 306) for the respective labeled training data sample x and P(T(x)) is the normalized teacher predicted logits 310 for respective labeled training data sample x.

KL divergence is used to measure the difference between the student predictions (i.e. the student predicted logits 306) and the teacher predictions (i.e. the teacher predicted logits 310). Minimizing the KL divergence, and therefore the KD loss 314, by adjusting the values of the learnable parameters of the student 234 should result in the student 234 learning to output student inference data 34 that is close to the teacher inference data 24.

At 410, the reweighting module 220 determines a weighted loss, shown here as reweighted loss 330, using a weighted loss function based on the knowledge distillation loss 314 and ground truth loss 312 for each respective labeled training data sample x in the batch of training data 302. In some embodiments, the reweighting module 220 determines the reweighted loss 330 by determining a knowledge distillation weight $$\lambda_x^{KD}$$

for the respective labeled training data sample x, determining a ground truth weight $$\lambda_x^{CE}$$

for the respective labeled training data sample x, and computing the reweighted loss 330 (denoted as L) as the sum of the knowledge distillation loss $L_{KD}(x)$ weighted by the knowledge distillation weight $$\lambda_x^{KD},$$

and the ground truth loss $L_{CE}(x)$ weighted by the ground truth weight $$\lambda_x^{CE}.$$

The reweighted loss 330 may be computed as a mean across the entire batch of training data X (i.e. the batch of training data 302) using the following weighted loss function:

$$L = \frac{1}{|X|} \sum_{k \in X} \lambda_x^{CE} \cdot L_{CE}(x) + \lambda_x^{KD} \cdot L_{KD}(x).$$

At 412, the gradient descent module 218 performs a gradient descent operation on the student 234 using the weighted loss function L to identify an adjusted set of values of the learnable parameters of the student 234. A gradient descent operation may be performed using any appropriate technique known in the field of machine learning to adjust each learnable parameter of the student 234, for example using backpropagation to perform gradient descent on each of the learnable parameters of the student 234. The gradient descent operation performed by the gradient descent module 218 is intended to compute or estimate a partial derivative of the value of each of the learnable parameters of the student 234 with respect to the weighted loss function L, using the chain rule as necessary to propagate the weighted loss 330 backward from the output nodes (e.g. an output layer of neurons) through the other nodes of the student 234. The adjusted values of the learnable parameters may be identified as values of the learned parameters that would result in a lower or minimized reweighted loss 330 with respect the current labeled training data sample x, or with respect to the entire batch of training data X.

At 414, the gradient descent module 218 adjusts the values of the learnable parameters of the student 234 to the adjusted set of values computed at operation 412.

In some embodiments, the method 400 may be repeated one or more times with additional batches of training data obtained (e.g., stochastically) from the training dataset 240. When the entire training dataset 240 has been used in at least one batch of training data to perform an iteration of method 400, that marks the end of a training epoch. In some embodiments, the device 200 may perform one or more additional training epochs, possibly with a different order or combinations of batches of training data 302 stochastically obtained from the training dataset 240, until a training termination conditions is reached (e.g., a predetermined number of training epochs defined by a training hyperparameter, or convergence of the student on a configuration of learnable parameter values as indicated by falling below a gradient threshold or satisfying some other convergence threshold).

As noted above, some embodiments may use a meta-reweighting module 510 as the reweighting module 220. Examples embodiments of a meta reweighting knowledge distillation system 500 and corresponding meta reweighting method 800 will now be described with reference to FIGS. 5-10. In these examples, the knowledge distillation weight $\lambda^{KD}$ and ground truth weight $\lambda^{CE}$ are determined by a meta reweighting process performed by the meta-reweighting module 510.

Figure 5:
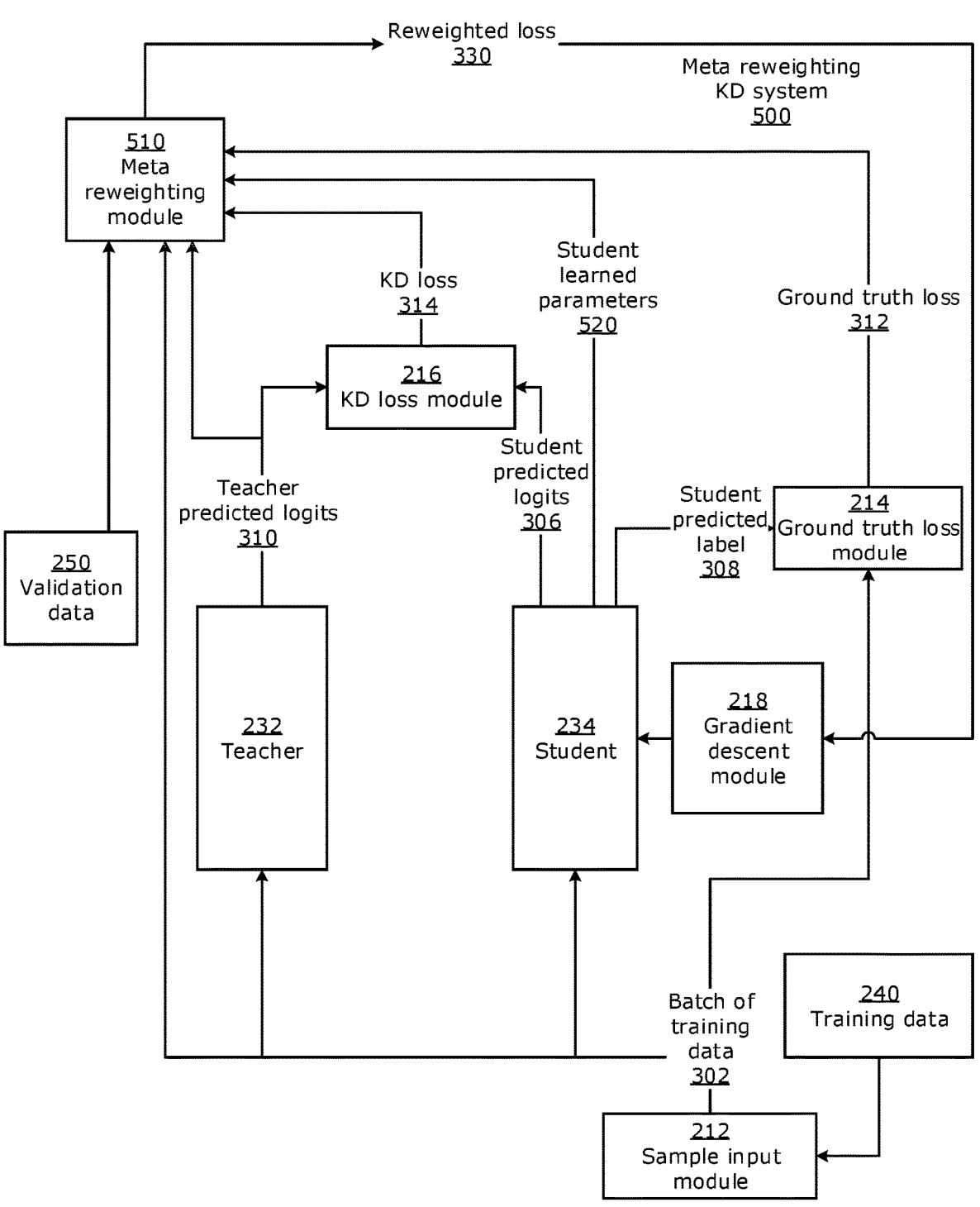
FIG. 5 is a block diagram showing a meta-reweighting knowledge distillation system, according to example embodiments described herein.

FIG. 5 is a block diagram showing a meta-reweighting knowledge distillation system 500. The operation of the meta-reweighting knowledge distillation system 500 is largely identical to that of the reweighting knowledge distillation system 300 of FIG. 3, with the exception of the reweighting module 220 being shown as a meta-reweighting module 510 that receives a different set of inputs (including labeled validation data samples obtained from a validation dataset 250). The operations of the meta-reweighting module 510 are described in general terms with reference to the meta-reweighting method 800 of FIG. 8.

FIG. 8 is a flowchart showing operations of an example method 800 for meta-reweighting to determine values for the knowledge distillation weight $\lambda^{KD}$ and ground truth weight $\lambda^{CE}$ used in operation 412 (i.e., determining the weighted loss) of the KD method 400 of FIG. 4. The method 800 is described as being performed by the meta-reweighting module 510 of the meta-reweighting knowledge distillation system 500. The meta-reweighting module 510 may include machine-executable instructions that are stored in memory device 200 and are executable by the processor 202 of the 208 of the device to perform the operations of the method 800. However, it will be appreciated that the method 800 could be performed by a system or device having a different configuration.

At 802, for each of the learnable parameters of the student 234, the meta-reweighting module 510 determines an optimized value of the learnable parameter as a function of the knowledge distillation weight $\lambda^{KD}$ and the ground truth weight $\lambda^{CE}$ with respect to a first batch of training data 302 obtained from the training dataset 240 (in this example, the batch of training data 302 includes labeled training data sample where each labeled data sample consists of input data and a corresponding ground truth label). This operation 802 may be referred to as a meta student training stage of the meta-reweighting process, and is described in greater detail below with reference to FIGS. 6 and 9.

At 804, the meta-reweighting module 510 determines an estimated optimized value of the knowledge distillation weight $\lambda^{KD}$ and an estimated optimized value of the ground truth weight $\lambda^{CE}$ with respect to a second batch of data (in this example, a batch of validation data obtained from the validation dataset 250). This operation 804 may be referred to as a reweighting stage of the meta-reweighting process, and is described in greater detail below with reference to FIGS. 7 and 10.

At 806, the meta-reweighting module 510 uses a the weighted loss function to compute a weighted loss (i.e. reweighted loss 330) as in the example described with respect to method 400 above: i.e., the weighted loss is computed as the sum of the knowledge distillation loss $L_{KD}(x)$ weighted by the knowledge distillation weight $$\lambda_x^{KD},$$

and the ground truth loss $L_{CE}(x)$ weighted by the ground truth weight $$\lambda_x^{CE}.$$

As in method 400, the reweighted loss 330 may be computed as a mean across the entire batch of training data X (i.e. all the labeled training samples in the batch of training data 302) using the following weighted loss function:

$$L = \frac{1}{|X|} \sum_{k \in X} \lambda_x^{CE} \cdot L_{CE}(x) + \lambda_x^{KD} \cdot L_{KD}(x).$$

In the examples of FIGS. 6, 9, 7, and 10, the meta-reweighting module 510 contains a meta-student 634 used by the meta-reweighting module 510 to learn meta knowledge. Meta knowledge may be regarded as a gradient direction with respect to a perturbation vector $\in$ (also denoted as $\{\in^{KD}, \in^{CE}\}$, being a vector consisting of a KD perturbation variable and a ground truth perturbation variable) which minimize a meta objective:

$$\min_{\in} \frac{1}{M} \sum_{j=1}^{M} L^{val}(\theta(\in)).$$

The perturbation vector $\in$ acts as a perturbation on the weights (i.e. KD weight $\lambda^{KD}$ and ground truth weight $\Delta^{CE}$), which is used to measure the impact of changing the weight values on a validation loss computed based on the student's predictions based on a batch of validation data obtained from the validation data 250. By computing a gradient of the validation loss with respect to E and performing a single step of gradient descent for each labeled training data sample in the batch of training data, an updated value of E can be used as an estimated optimal value of the weights $\lambda^{KD}$ and $\lambda^{CE}$ for a given labeled training data sample, thereby providing weight values for the weighted loss function which can be used to compute the reweighted loss 330.

In the meta reweighting KD system 500 of FIGS. 5-10, the batches of training data obtained from the training dataset 240 and/or the batches of validation data obtained from the validation dataset 250 used in the described examples may be small batches referred to as mini-batches. This may mean that more mini-batches of training data are processed in each training epoch. There may be advantages to using small batches of training data, such as allowing training of the student to be performed on a computing device which does not include sufficient computational resources to load a full-sized batch of labeled training data samples. In some example, a mini-batch of training data obtained from the training dataset 240 or batches of validation data obtained from a validation dataset 250 may consist of a small number of labeled data samples, such as 32 labeled data samples.

Figure 6:
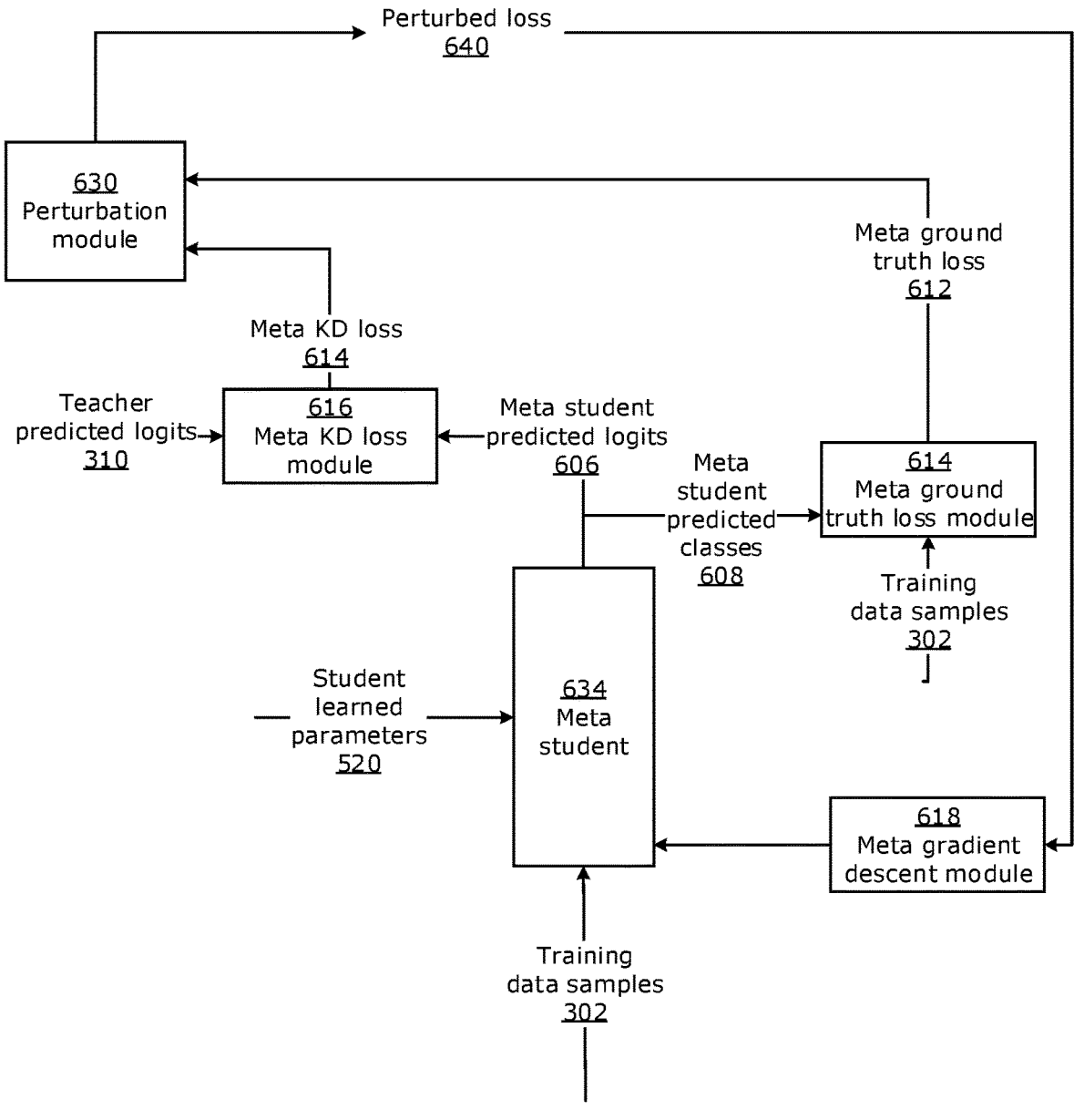
FIG. 6 is a block diagram showing a meta-reweighting module operating in a meta student training stage, according to example embodiments described herein.

FIG. 6 is a block diagram showing modules and data flow of the meta-reweighting module 510 operating in a meta student training stage 600 to perform the operation 802 of method 800. The operations of the meta-reweighting module 510 in the meta student training stage 600 will be described with reference to FIG. 9 below.

FIG. 9 shows example sub-operations of the operation 802 of the method 800 of FIG. 8 to determine the optimized values of the learnable parameters of the student 234 in the meta student training stage 600. Whereas the operation 802 is described with reference to the example meta-reweighting module 510 operating in a meta student training stage 600 as shown in FIG. 6, it will be appreciated that the operation 802 may be performed using other systems or modules.

At 904, a meta student 634 (denoted as $\hat{S}_{\theta}(\cdot)$) is generated and the values of the learnable parameters of the meta student 634 are initialized with the values of the student learnable parameters 520 (denoted as $\theta$). The meta student 634 therefore has the same learnable parameter values as the student 234 (denoted as $S_{\theta}(\cdot)$) in its current state, which may be a temporary state during the training of the student. The meta student 634 may thus be regarded as a copy or clone of the current state of the student 234 (i.e. the student as currently trained).

At 906, the meta student 634 receives the labeled training data samples of a batch of training data and processes the input data of each respective labeled training data sample in the batch of training data X, also denoted as $X_{train}$, to generate a meta student prediction based on the respective input data. Like the student prediction described above with reference to FIGS. 3-4, the meta student prediction may include meta student predicted logits 606 and/or meta student predicted classes 608, the latter of which may be derived from the former.

At 908, for each respective labeled training data sample in the batch of training data, a meta ground truth loss module 614 processes the meta student prediction (e.g., the meta student predicted classes 608) and the corresponding ground truth label of the respective labeled training data sample to compute a respective meta ground truth loss 612. The meta ground truth loss 612 may be computed identically to the ground truth loss 312 described above with reference to FIGS. 3-4.

At 910, for each respective labeled training data sample in the batch of training data, a meta KD loss module 616 processes the meta student prediction (e.g., the meta student predicted logits 606) and the teacher prediction (e.g., the teacher predicted logits 310) to compute a respective meta knowledge distillation loss 614. The meta knowledge distillation loss 614 may be computed identically to the knowledge distillation loss 314 described above with reference to FIGS. 3-4.

At 912, a perturbation module 630 determines a perturbed loss function 640 that may be computed analogously to the reweighted loss 330 of FIGS. 3-4, i.e., the sum of the meta knowledge distillation loss 614 weighted by the knowledge distillation perturbation variable $$\epsilon_x^{KD},$$

and the meta ground truth loss 612 weighted by the ground truth perturbation variable $$\epsilon_x^{CE}.$$

The perturbed loss function 640 (denoted here as $L_{meta}$) over the batch of training data $X_{train}$ may be formulated as:

$$L_{meta} = \sum_{x \in X_{train}} \epsilon_x^{CE} L_{CE}\big(y, \hat{S}_{\theta}(x)\big) + \epsilon_x^{KD} L_{KD}\big(T(x), \hat{S}_{\theta}(x)\big).$$

At 914, a meta gradient descent module 618 performs a gradient descent operation (e.g., using back-propagation) on the meta student model 634 using the perturbed loss function 630 to identify an optimal set of values $\hat{\theta}$ of the learnable parameters $\theta$ of the meta student model 634. A consequence of the gradient descent operation is that each learnable parameter value in the optimal set of values $\hat{\theta}$ is defined as a function of the knowledge distillation perturbation variable $$\epsilon_x^{KD}$$

and the ground truth perturbation variable $$\epsilon_x^{CE},$$

because the perturbed loss function 630, $$L_{meta} = \sum_{x \in X_{train}} \epsilon_x^{CE} L_{CE}\big(y, \hat{S}_{\theta}(x)\big) + \epsilon_x^{KD} L_{KD}\big(T(x), \hat{S}_{\theta}(x)\big),$$

is a function of the knowledge distillation knowledge distillation perturbation variable $$\epsilon_x^{KD}$$

and the ground truth perturbation variable $$\epsilon_x^{CE}.$$

At 916, the meta gradient descent module 618 updates or adjusts the values of the learnable parameters $\theta$ of the meta student 634 to the optimal set of values based on a predetermined value of the knowledge distillation perturbation variable $\epsilon^{KD}$ and a predetermined value of the ground truth perturbation variable $\epsilon^{CE}$, thereby generating an adjusted meta student model 634 denoted as $\hat{S}_{\hat{\theta}}(\cdot)$. The gradient descent and learnable parameter adjustment operations 914, 916 may be denoted as:

$$\hat{\theta} = \theta - \alpha \cdot \nabla_{\theta} L_{meta}(\theta)$$

wherein α denotes a step size or learning rate hyperparameter for determining how far to adjust the learnable parameters during gradient descent.

In some embodiments, the predetermined value of the knowledge distillation perturbation variable $\in^{KD}$ is zero, and the and the predetermined value of the ground truth perturbation variable $\in^{CE}$ is zero, such that adjusting the values of the learnable parameters of the meta student model 634 at operation 916 comprises leaving the values of the learnable parameters of the meta student model 634 unchanged, because the loss value of the perturbed loss function 630 is equal to zero. Using zero as the predetermined values may thereby simplify the meta-reweighting operation, and may also preserve the initial values of the learnable parameters of the meta student model 634, thereby resulting in greater accuracy in computing the reweighted loss 330 during the reweighting stage 700 described below with reference to FIGS. 7 and 10.

After sub-step 916 of operation 802 has been completed, the meta student training stage 600 of the meta-reweighting module 510 is complete. The meta-reweighting module 510 then proceeds to the reweighting stage 700 described below with reference to FIGS. 7 and 10.

Figure 7:
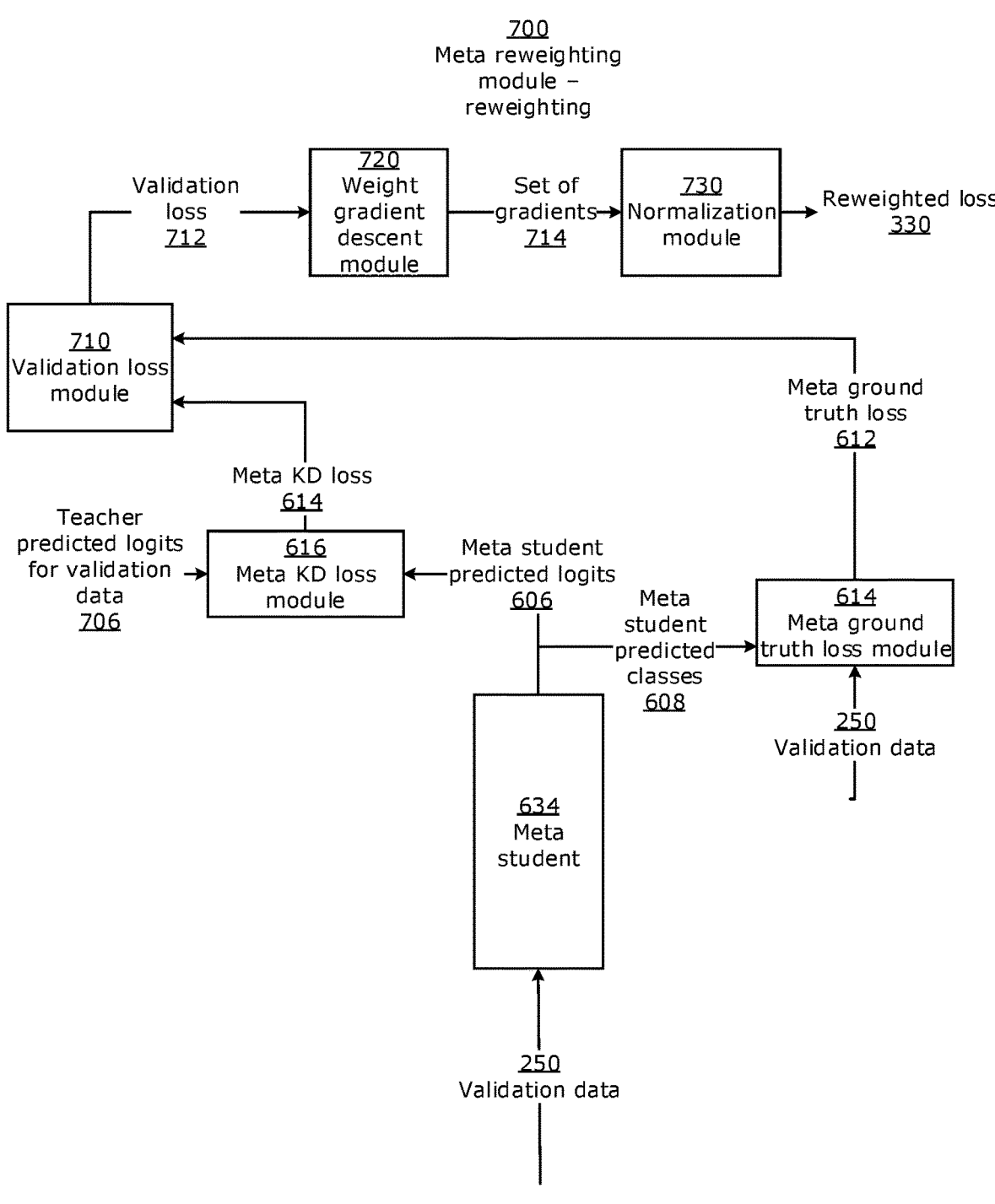
FIG. 7 is a block diagram showing the meta-reweighting module of FIG. 6 operating in a reweighting stage.

FIG. 7 shows the meta-reweighting module 510 operating in the reweighting stage 700. The operations of the meta-reweighting module 510 in the reweighting stage 700 are described with reference to FIG. 10 below.

FIG. 10 shows example sub-operations of the operation 804 of the method 800 of FIG. 8 to determine estimated optimized knowledge distillation weight and ground truth weight values in the reweighting stage 700. Whereas the operation 804 is described with reference to the example meta-reweighting module 510 operating in a reweighting stage 700 as shown in FIG. 7, it will be appreciated that the operation 804 may be performed using other systems or modules.

At 1006, a batch of the validation data $X_{val}$ is obtained from the validation dataset 250 and the input data of each respective labeled validation data sample in the batch of validation data $X_{val}$ is processed by the adjusted meta student model 634, i.e. $\hat{S}_{\hat{\theta}}(\cdot)$, to generate, a meta student prediction based on the input data (e.g. meta student predicted logits 606 and/or meta student predicted classes 608).

At 1008, for each labeled validation data sample in the batch of validation data $X_{val}$ obtained from the validation dataset 250, as in operation 908 in FIG. 9, the meta ground truth loss module 614 processes the meta student prediction (e.g., the meta student predicted classes 608) and the corresponding ground truth label to compute a respective meta ground truth loss 612. The meta ground truth loss 612 may be computed identically to the ground truth loss 312 described above with reference to FIGS. 3-4.

At 1010, the teacher 232 processes the input data of each respective labeled validation data sample in the batch of validation data $X_{val}$ obtained from the validation dataset 250 to generate a teacher prediction based on the input data, e.g. teacher predicted logits 706.

At 1012, for each respective labeled validation data sample in the batch of validation data obtained from the validation dataset 250, as in operation 910 in FIG. 9, the meta KD loss module 616 processes the meta student prediction (e.g., the meta student predicted logits 606) and the teacher prediction (e.g., the teacher predicted logits 706) to compute a respective meta knowledge distillation loss 614. The meta knowledge distillation loss 614 may be computed identically to the knowledge distillation loss 314 described above with reference to FIGS. 3-4.

At 1014, a validation loss module 710 determines a validation loss function 712 (denoted as $L_{val}$) equal to the sum of the meta knowledge distillation loss 614 and the meta ground truth loss 612 for each labeled validation data sample x in the batch of validation data $X_{val}$ obtained from the validation dataset 250. The validation loss 712 may therefore be computed using the following validation loss function:

$$L_{val} = \sum_{x \in X_{val}} L_{CE}\left(y, \hat{S}_{\hat{\theta}}(x)\right) + L_{KD}\left(T(x), \hat{S}_{\hat{\theta}}(x)\right)$$

wherein y is the ground truth label of each labeled data sample x in the batch of the validation data $X_{val}$ obtained from the validation dataset 250, $\hat{S}_{\hat{\theta}}(x)$ is the meta student prediction (e.g. meta student predicted logits 606 or meta student predicted classes 608) of the adjusted meta student 634, and T(x) is the teacher predicted logits 706 for data sample x in the batch of validation data $X_{val}$ obtained from the validation dataset 250.

At 1016, for each labeled training data sample in the batch of training data, a weight gradient descent module 720 performs a gradient descent operation on the validation loss 712 with respect to the knowledge distillation perturbation variable and the ground truth perturbation variable. First, a gradient $$\{u_x^{CE}, u_x^{KD}\}$$

is computed for each labeled training data sample x. This is possible because, for each labeled training data sample in the batch of training data, the optimal set of values $\hat{\theta}$ of the learnable parameters of the meta student 634 are each defined as a function of the knowledge distillation perturbation variable $\in^{KD}$ and the ground truth perturbation variable $\in^{CE}$. The result of the gradient descent operation is a set of gradients 714, including a gradient for each labeled training data sample in the batch of training data. The computed gradients 714 constitute the result of a single step of gradient descent performed on the knowledge distillation perturbation variable $\in^{KD}$ and the ground truth perturbation variable $\in^{CE}$.

The gradient for each labeled training data sample in the batch of training data may consist of $$\{u_x^{CE}, u_x^{KD}\}$$

such that:

$$u_x^{CE} = -\beta \cdot \frac{\partial \hat{\theta}}{\partial_{\epsilon_x^{CE}}} \cdot \frac{\partial}{\partial_{\hat{\theta}}} L_{val}\left(\hat{\theta}(\epsilon)\right)$$

$$u_x^{KD} = -\beta \cdot \frac{\partial \hat{\theta}}{\partial_{\epsilon_x^{KD}}} \cdot \frac{\partial}{\partial_{\hat{\theta}}} L_{val}\left(\hat{\theta}(\epsilon)\right)$$

wherein β is a further step size hyperparameter (e.g., a constant value $1 \times e^{-3}$).

The set of gradients 714 may be processed by a normalization module 730 to generate an estimated optimized value of the knowledge distillation weight $\lambda^{KD}$ and an estimated optimized value of the ground truth weight $\lambda^{CE}$ for each labeled training data sample x in the batch $X_{train}$ of training data obtained from the training dataset 240:

$$\lambda_x^{CE} = \frac{u_x^{CE}}{u_x^{CE} + u_x^{KD}}, \lambda_x^{KD} = \frac{u_x^{KD}}{u_x^{CE} + u_x^{KD}}, x \in X_{train}.$$

By performing only a single step of gradient descent (i.e., the adjustment to the knowledge distillation perturbation variable and ground truth perturbation variable is equal to the step size multiplied by the gradient), the meta-reweighting process can estimate optimal values for the knowledge distillation weight $\lambda^{KD}$ and ground truth weight $\lambda^{CE}$ efficiently. This efficiency may be important for performing training with finite time and finite computing resources, given that the meta-reweighting process takes place within a nested loop within the training process.

After the meta-reweighting module 510 performs during the meta student training stage 600 and operation 804 at the reweighting stage 700, the meta-reweighting module 510 performs operation 806 to apply the estimated optimized value of the knowledge distillation weight $\lambda^{KD}$ and the estimated optimized value of the ground truth weight $\lambda^{CE}$ for each labeled training data sample in the batch (denoted here as $X_{train}$) of training data obtained from the training dataset 240 to compute the reweighted loss 330 (denoted here as $L_{train}$) for the meta-reweighting knowledge distillation system 500 using the following weighted loss function:

$$L_{train} = \frac{1}{|X_{train}|} \sum_{x \in X_{train}} \lambda_x^{CE} L_{CE}(y, S_\theta(x)) + \lambda_x^{KD} L_{KD}(T(x), S_\theta(x))$$

The meta-reweighting knowledge distillation system 500 may then perform the operations of method 400 to compute the reweighted loss 330, perform gradient descent on the student 234, and adjust the learnable parameter values of the student 234 as described above with reference to FIG. 4. It will be appreciated that, for each batch of training data obtained from the training dataset 240, the meta-reweighting method 800 may be performed prior to operation 402 of method 400 or at any other time prior to the computation of the reweighted loss 330 at operation 410.

Method 400 (including method 800 used to compute the weighted loss 330 at operation 410) may be repeated one or more additional times after the first time for one or more additional batches of training data obtained from the training dataset 240. One or more additional batches of labeled training data samples may be obtained (e.g. from the training dataset 240 stored in the memory 208), and, for each additional batch of training data, an additional batch of validation data may also be obtained (e.g., from the validation dataset 250 stored in the memory). In some embodiments, the same batch $X_{val}$ of validation data obtained from the validation dataset 250 used to perform the first iteration of method 400 may be used again as one or more of the additional batches of validation data obtained from the validation dataset 250. The operations of method 400 may be repeated for each of the one or more additional batches of training data obtained from the training dataset 240, and the operations of method 800 may be performed for the one or more additional batches of training data obtained from the training dataset 240 and one or more additional batches of validation data obtained from the validation dataset 250.

When the entire training dataset 240 (e.g. all of the labeled training data samples in the training dataset 240) has been processed to perform KD using method 400, this marks the end of a training epoch. Further training epochs may then be performed, as described above.

In some embodiments, the meta-reweighting method 800 described above with reference to FIGS. 6-10 may be modified to apply to domains other than knowledge distillation, or to different types of knowledge distillation. The meta-reweighting method 800 may be applied to any system for training a neural network model for an inference task that uses multiple objectives, as long as the different objectives are implemented as multiple loss functions used to train the model.

Thus, in alternative embodiments, a method may be provided for training a model for an inference task using machine learning based on a first loss function and a second loss function. The first loss function and second loss function are computed. A weighted loss function is then determined, comprising a sum of the first loss function weighted by a first weight and the second loss function weighted by a second weight. These weights may be determined using the meta-reweighting method 800 described above, wherein the first loss function and second loss function are substituted for the KD loss function and CE loss function, respectively, and the model being trained is substituted for the student 234. In other words, the model is trained to determine an optimized state of the model as a function of the first weight and the second weight (as in the meta student training 600), then the model is further trained (e.g. using forward propagation of the labeled validation data samples obtained from a validation dataset 250) to compute a gradient of a validation loss function with respect to the first weight and the second weight (as in the reweighting stage 700). An estimated optimized value of the first weight and an estimated optimized value of the second weight are computed based on the gradient, and the values of the learnable parameters of the model are adjusted using the weighted loss function.

GENERAL

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes machine-executable instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for knowledge distillation, comprising:

obtaining a batch of training data comprising one or more labeled training data samples, each labeled training data sample having a respective ground truth label;

processing the batch of training data, using a student model comprising a plurality of learnable parameters, to generate, for input data in each data sample in the batch of training data, a student prediction;

for each labeled training data sample in the batch of training data, processing the student prediction and the ground truth label to compute a respective ground truth loss;

processing the batch of training data, using a trained teacher model, to generate, for each labeled training data sample in the batch of training data, a teacher prediction;

for each labeled data sample in the batch of training data, processing the student prediction and the teacher prediction to compute a respective knowledge distillation loss;

determining a weighted loss that is a weighted sum of the knowledge distillation loss and ground truth loss for each labeled training data sample in the batch of training data, the determining including:

determining a knowledge distillation weight for the labeled training data sample, the knowledge distillation weight being used to weight the knowledge distillation loss representing a difference between the student prediction and the teacher prediction for the labeled training data sample;

determining a ground truth weight for the labeled training data sample, the ground truth weight being used to weight the ground truth loss representing a difference between the student prediction and the ground truth label for the labeled training data sample; and computing the weighted loss as the sum of:

the knowledge distillation loss weighted by the knowledge distillation weight; and the ground truth loss weighted by the ground truth weight;

performing gradient descent on the student model using the weighted loss to identify an adjusted set of values for the plurality of learnable parameters of the student; and adjusting the values of the plurality of learnable parameters of the student to the adjusted set of values.

2. The method of claim 1, wherein the knowledge distillation weight and ground truth weight are determined based on user input.

3. The method of claim 1, wherein the knowledge distillation weight and ground truth weight are determined by a meta reweighting process.

4. The method of claim 3, wherein the meta reweighting process comprises:

for each respective learnable parameter of the plurality of learnable parameters of the student, determining an optimized value of the respective learnable parameter as a function of a knowledge distillation perturbation variable and a ground truth perturbation variable with respect to the batch of training data;

determining, for each labeled training data sample in the batch of training data, a respective estimated optimized value of the knowledge distillation perturbation variable and a respective estimated optimized value of the ground truth perturbation variable with respect to a batch of validation data; and for each labeled training data sample in the batch of training data, using the respective estimated optimized value of the knowledge distillation perturbation variable as the knowledge distillation weight and the respective estimated optimized value of the ground truth perturbation variable as the ground truth weight.

5. The method of claim 4, wherein:

determining the optimized value of each respective learnable parameter as a function of the knowledge distillation weight and the ground truth weight comprises:

generating a meta student model having a plurality of learnable parameters with values equal to the values of the plurality of learnable parameters of the student model;

processing the batch of training data, using the meta student model, to generate, for each labeled training data sample in the batch of training data, a meta student prediction;

for each labeled training data sample in the batch of training data, processing the meta student prediction and the ground truth label to compute a respective meta ground truth loss;

for each labeled training data sample in the batch of training data, processing the meta student prediction and the teacher prediction to compute a respective meta knowledge distillation loss;

determining a perturbed loss as the sum of:

the meta knowledge distillation loss weighted by the knowledge distillation perturbation variable; and the meta ground truth loss weighted by the ground truth perturbation variable;

performing gradient descent on the meta student model using the perturbed loss to identify an optimal set of values of the plurality of learnable parameters of the meta student model, such that each value in the optimal set of values is defined as a function of the knowledge distillation perturbation variable and the ground truth perturbation variable; and adjusting the values of the plurality of learnable parameters of the meta student model to the optimal set of values based on a predetermined value of the knowledge distillation perturbation variable and a predetermined value of the ground truth perturbation variable, thereby generating an adjusted meta student model.

6. The method of claim 5, wherein:

the predetermined value of the knowledge distillation perturbation variable is zero; and the predetermined value of the ground truth perturbation variable is zero, and wherein adjusting the values of the plurality of learnable parameters of the meta student model comprises leaving the values of the plurality of learnable parameters of the meta student model unchanged.

7. The method of claim 5, wherein:

the batch of validation data comprises one or more labeled validation data samples, each labeled validation data sample having a respective ground truth label; and determining, for each data sample in the batch of training data, a respective estimated optimized value of the knowledge distillation perturbation variable and a respective estimated optimized value of the ground truth perturbation variable with respect to a second batch of data comprises:

processing the batch of validation data, using the adjusted meta student model, to generate, for each labeled validation data sample in the batch of validation data, a meta student prediction;

for each labeled validation data sample in the batch of validation data, processing the adjusted meta student prediction and the ground truth label to compute a respective meta ground truth loss;

processing the batch of validation data, using the teacher model, to generate, for each labeled validation data sample in the batch of validation data, a teacher validation prediction;

for each labeled validation data sample in the batch of training data, processing the adjusted meta student prediction and the teacher validation prediction to compute a respective meta knowledge distillation loss;

determining a validation loss based on the meta knowledge distillation loss and the meta ground truth loss for each labeled validation data sample in the batch of validation data;

for each labeled training data sample in the batch of training data:

computing a gradient of the validation loss with respect to the knowledge distillation perturbation variable and the ground truth perturbation variable by computing a gradient of the validation loss with respect to the optimal set of values of the plurality of learnable parameters of the meta student model, each learnable parameter value of the optimal set of values being defined as a function of the knowledge distillation perturbation variable and the ground truth perturbation variable;

performing gradient descent to compute:

the estimated optimized value of the knowledge distillation perturbation variable; and the estimated optimized value of the ground truth perturbation variable.

8. The method of claim 7, further comprising:

obtaining one or more additional batches of training data;

obtaining, for each additional batch of training data, an additional batch of validation data; and repeating, for each additional batch of training data, generating the student predictions, computing the ground truth losses, generating the teacher predictions, computing the knowledge distillation losses, determining the weighted loss, identifying the adjusted set of values of the plurality of learnable parameters of the student, and adjusting the values of the plurality of learnable parameters of the student.

9. The method of claim 1, wherein:

the ground truth loss comprises a cross entropy loss; and the trained teacher model is trained to perform a natural language processing binary classification task on training data wherein each labeled training data sample comprises input data comprising a plurality of text tokens.

10. A device, comprising:

a processor; and a memory having stored thereon instructions which, when executed by the processor, cause the device to:

obtain a batch of training data comprising one or more labeled training data samples, each labeled training data sample having a respective ground truth label;

process the batch of training data, using a student model comprising a plurality of learnable parameters, to generate, for input data in each data sample in the batch of training data, a student prediction;

for each labeled training data sample in the batch of training data, process the student prediction and the ground truth label to compute a respective ground truth loss;

process the batch of training data, using a trained teacher model, to generate, for each labeled training data sample in the batch of training data, a teacher prediction;

for each labeled data sample in the batch of training data, process the student prediction and the teacher prediction to compute a respective knowledge distillation loss;

determine a weighted loss based on that is a weighted sum of the knowledge distillation loss and ground truth loss for each labeled training data sample in the batch of training data by:

determining a knowledge distillation weight for the labeled training data sample, the knowledge distillation weight being used to weight the knowledge distillation loss representing a difference between the student prediction and the teacher prediction for the labeled training data sample;

determining a ground truth weight for the labeled training data sample, the ground truth weight being used to weight the ground truth loss representing a difference between the student prediction and the ground truth label for the labeled training data sample; and computing the weighted loss as the sum of:

the knowledge distillation loss weighted by the knowledge distillation weight; and the ground truth loss weighted by the ground truth weight;

perform gradient descent on the student model using the weighted loss to identify an adjusted set of values for the plurality of learnable parameters of the student; and adjust the values of the plurality of learnable parameters of the student to the adjusted set of values.

11. The device of claim 10, wherein the knowledge distillation weight and ground truth weight are determined by a meta reweighting process comprising:

for each respective learnable parameter of the plurality of learnable parameters of the student, determining an optimized value of the respective learnable parameter as a function of a knowledge distillation perturbation variable and a ground truth perturbation variable with respect to the batch of training data;

determining, for each labeled training data sample in the batch of training data, a respective estimated optimized value of the knowledge distillation perturbation variable and a respective estimated optimized value of the ground truth perturbation variable with respect to a batch of validation data; and for each labeled training data sample in the batch of training data, using the respective estimated optimized value of the knowledge distillation perturbation variable as the knowledge distillation weight and the respective estimated optimized value of the ground truth perturbation variable as the ground truth weight.

12. The device of claim 11, wherein:

determining the optimized value of each respective learnable parameter as a function of the knowledge distillation weight and the ground truth weight comprises:

generating a meta student model having a plurality of learnable parameters with values equal to the values of the plurality of learnable parameters of the student model;

processing the batch of training data, using the meta student model, to generate, for each labeled training data sample in the batch of training data, a meta student prediction;

for each labeled training data sample in the batch of training data, processing the meta student prediction and the ground truth label to compute a respective meta ground truth loss;

for each labeled training data sample in the batch of training data, processing the meta student prediction and the teacher prediction to compute a respective meta knowledge distillation loss;

determining a perturbed loss as the sum of:
the meta knowledge distillation loss weighted by the knowledge distillation perturbation variable; and
the meta ground truth loss weighted by the ground truth perturbation variable;

performing gradient descent on the meta student model using the perturbed loss to identify an optimal set of values of the plurality of learnable parameters of the meta student model, such that each value in the optimal set of values is defined as a function of the knowledge distillation perturbation variable and the ground truth perturbation variable; and adjusting the values of the plurality of learnable parameters of the meta student model to the optimal set of values based on a predetermined value of the knowledge distillation perturbation variable and a predetermined value of the ground truth perturbation variable, thereby generating an adjusted meta student model.

13. The device of claim 12, wherein:

the predetermined value of the knowledge distillation perturbation variable is zero; and the predetermined value of the ground truth perturbation variable is zero, and wherein adjusting the values of the plurality of learnable parameters of the meta student model comprises leaving the values of the plurality of learnable parameters of the meta student model unchanged.

14. The device of claim 12, wherein:

the batch of validation data comprises one or more labeled validation data samples, each labeled validation data sample having a respective ground truth label; and determining, for each data sample in the batch of training data, a respective estimated optimized value of the knowledge distillation perturbation variable and a respective estimated optimized value of the ground truth perturbation variable with respect to a second batch of data comprises:

processing the batch of validation data, using the adjusted meta student model, to generate, for each labeled validation data sample in the batch of validation data, a meta student prediction;

for each labeled validation data sample in the batch of validation data, processing the adjusted meta student prediction and the ground truth label to compute a respective meta ground truth loss;

processing the batch of validation data, using the teacher model, to generate, for each labeled validation data sample in the batch of validation data, a teacher validation prediction;

for each labeled validation data sample in the batch of training data, processing the adjusted meta student prediction and the teacher validation prediction to compute a respective meta knowledge distillation loss;

determining a validation loss based on the meta knowledge distillation loss and the meta ground truth loss for each labeled validation data sample in the batch of validation data;

for each labeled training data sample in the batch of training data:

computing a gradient of the validation loss with respect to the knowledge distillation perturbation variable and the ground truth perturbation variable by computing a gradient of the validation loss with respect to the optimal set of values of the plurality of learnable parameters of the meta student model, each learnable parameter value of the optimal set of values being defined as a function of the knowledge distillation perturbation variable and the ground truth perturbation variable;

performing gradient descent to compute:
the estimated optimized value of the knowledge distillation perturbation variable; and
the estimated optimized value of the ground truth perturbation variable.

15. The device of claim 14, wherein the instructions, when executed by the processor, further cause the device to:

obtain one or more additional batches of training data;

obtain, for each additional batch of training data, an additional batch of validation data; and repeat, for each additional batch of training data, generating the student predictions, computing the ground truth losses, generating the teacher predictions, computing the knowledge distillation losses, determining the weighted loss, identifying the adjusted set of values of the plurality of learnable parameters of the student, and adjusting the values of the plurality of learnable parameters of the student.

16. The device of claim 10, wherein:

the ground truth loss comprises a cross entropy loss; and the trained teacher model is trained to perform a natural language processing binary classification task on training data wherein each labeled training data sample comprises input data comprising a plurality of text tokens.

17. A non-transitory processor-readable medium containing instructions which, when executed by a processor of a device, cause the device to:

obtain a batch of training data comprising one or more labeled training data samples, each labeled training data sample having a respective ground truth label;

process the batch of training data, using a student model comprising a plurality of learnable parameters, to generate, for input data in each data sample in the batch of training data, a student prediction;

for each labeled training data sample in the batch of training data, process the student prediction and the ground truth label to compute a respective ground truth loss;

process the batch of training data, using a trained teacher model, to generate, for each labeled training data sample in the batch of training data, a teacher prediction;

for each labeled data sample in the batch of training data, process the student prediction and the teacher prediction to compute a respective knowledge distillation loss;

determine a weighted loss that is a weighted sum of the knowledge distillation loss and ground truth loss for each labeled training data sample in the batch of training data by:

determining a knowledge distillation weight for the labeled training data sample, the knowledge distillation weight being used to weight the knowledge distillation loss representing a difference between the student prediction and the teacher prediction for the labeled training data sample;

determining a ground truth weight for the labeled training data sample, the ground truth weight being used to weight the ground truth loss representing a difference between the student prediction and the ground truth label for the labeled training data sample; and computing the weighted loss as the sum of:

the knowledge distillation loss weighted by the knowledge distillation weight; and the ground truth loss weighted by the ground truth weight;

perform gradient descent on the student model using the weighted loss to identify an adjusted set of values for the plurality of learnable parameters of the student; and adjust the values of the plurality of learnable parameters of the student to the adjusted set of values.

18. The non-transitory process-readable medium of claim 17, wherein the knowledge distillation weight and ground truth weight are determined based on user input.

19. The non-transitory process-readable medium of claim 17, wherein the knowledge distillation weight and ground truth weight are determined by a meta reweighting process.

20. The non-transitory process-readable medium of claim 19, wherein the meta reweighting process comprises:

for each respective learnable parameter of the plurality of learnable parameters of the student, determining an optimized value of the respective learnable parameter as a function of a knowledge distillation perturbation variable and a ground truth perturbation variable with respect to the batch of training data;

determining, for each labeled training data sample in the batch of training data, a respective estimated optimized value of the knowledge distillation perturbation variable and a respective estimated optimized value of the ground truth perturbation variable with respect to a batch of validation data; and for each labeled training data sample in the batch of training data, using the respective estimated optimized value of the knowledge distillation perturbation variable as the knowledge distillation weight and the respective estimated optimized value of the ground truth perturbation variable as the ground truth weight.

\* \* \* \* \*